(12) United States Patent
Moen et al.

(10) Patent No.: US 10,164,948 B1
(45) Date of Patent: *Dec. 25, 2018

(54) BLIND HASH COMPRESSION

(71) Applicant: Shape Security, Inc., Palo Alto, CA (US)

(72) Inventors: Daniel G. Moen, Sunnyvale, CA (US); Bryan D. Hanks, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/980,231

(22) Filed: Dec. 28, 2015

Related U.S. Application Data

(63) Continuation of application No. 14/160,107, filed on Jan. 21, 2014, now Pat. No. 9,225,729.

(51) Int. Cl.
*G06F 11/00* (2006.01)
*H04L 29/06* (2006.01)
*H04L 9/06* (2006.01)

(52) U.S. Cl.
CPC ........ *H04L 63/0428* (2013.01); *H04L 9/0643* (2013.01); *H04L 63/0876* (2013.01); *H04L 2209/16* (2013.01)

(58) Field of Classification Search
CPC .. H04L 9/3223; H04L 9/3236; H04L 2209/30
USPC .............................. 713/176, 180–181; 726/22
See application file for complete search history.

(56) References Cited

U.S. PATENT DOCUMENTS

| | | |
|---|---|---|
| 5,509,076 A | 4/1996 | Sprunk |
| 6,343,313 B1 * | 1/2002 | Salesky ................ G06F 3/1415 709/203 |
| 6,654,707 B2 | 11/2003 | Wynn |
| 6,938,170 B1 | 8/2005 | Kraft et al. |

(Continued)

FOREIGN PATENT DOCUMENTS

| | | |
|---|---|---|
| CN | 101471818 | 5/2011 |
| GB | 2443093 | 4/2008 |

(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages , Jun. 2012.

(Continued)

*Primary Examiner* — Samson B Lemma

(57) ABSTRACT

A computer-implemented method includes serving, from a computer server system and to a plurality of different computing devices remote from the computer server system, web code and code for reporting status of the computing devices; receiving from one or more of the computing devices, first data that indicates a parameter of the one or more computing devices, the first data in a compressed format; receiving from one or more others of the computing devices, second data that indicates the parameter of the one or more others of the computing devices, the second data in an uncompressed format; and compressing the second data and comparing the compressed second data to the first data to correlate the first data to the second data. The code for reporting status of the computing devices can include code for allowing the computing devices to determine whether to send the first or second data.

20 Claims, 6 Drawing Sheets

(56) References Cited

U.S. PATENT DOCUMENTS

| | | | |
|---|---|---|---|
| 7,051,362 B2* | 5/2006 | Shuster | G06F 21/6218 709/219 |
| 7,058,699 B1 | 6/2006 | Chiou et al. | |
| 7,107,347 B1 | 9/2006 | Cohen | |
| 7,117,429 B2 | 10/2006 | Vedullapalli et al. | |
| 7,398,553 B1 | 7/2008 | Li | |
| 7,424,720 B2 | 9/2008 | Chagoly | |
| 7,464,326 B2 | 12/2008 | Kawai et al. | |
| 7,480,385 B2 | 1/2009 | Weber | |
| 7,500,099 B1 | 3/2009 | McElwee et al. | |
| 7,707,223 B2 | 4/2010 | Zubenko et al. | |
| 7,836,425 B2 | 11/2010 | Rubin et al. | |
| 7,849,502 B1 | 12/2010 | Bloch et al. | |
| 7,870,610 B1 | 1/2011 | Mitchell | |
| 7,895,653 B2 | 2/2011 | Calo et al. | |
| 8,020,193 B2 | 9/2011 | Bhola et al. | |
| 8,086,756 B2 | 12/2011 | Kamyshenko et al. | |
| 8,086,957 B2 | 12/2011 | Bauchot et al. | |
| 8,170,020 B2 | 5/2012 | Oliver et al. | |
| 8,181,104 B1 | 5/2012 | Helfand | |
| 8,195,953 B1 | 6/2012 | Yue | |
| 8,200,958 B2 | 6/2012 | Coppola et al. | |
| 8,225,401 B2 | 7/2012 | Sobel et al. | |
| 8,266,202 B1 | 9/2012 | Colton et al. | |
| 8,332,952 B2 | 12/2012 | Zhang et al. | |
| 8,347,396 B2 | 1/2013 | Grigsby et al. | |
| 8,453,126 B1 | 5/2013 | Ganelin | |
| 8,527,774 B2 | 9/2013 | Fallows et al. | |
| 8,533,480 B2 | 9/2013 | Pravetz et al. | |
| 8,555,388 B1 | 10/2013 | Wang et al. | |
| 8,561,193 B1 | 10/2013 | Srivastava et al. | |
| 8,578,499 B1 | 11/2013 | Zhu | |
| 8,589,405 B1 | 11/2013 | Estan | |
| 8,601,064 B1 | 12/2013 | Liao | |
| 8,621,197 B2 | 12/2013 | Suryanarayana et al. | |
| 8,650,648 B2 | 2/2014 | Howard et al. | |
| 8,677,481 B1 | 3/2014 | Lee | |
| 8,689,330 B2 | 4/2014 | Sinn et al. | |
| 8,713,631 B1 | 4/2014 | Pavlyushchik | |
| 8,726,394 B2 | 5/2014 | Maor | |
| 8,739,284 B1 | 5/2014 | Gardner | |
| 8,752,208 B2 | 6/2014 | Shulman | |
| 8,762,962 B2 | 6/2014 | Ben-Artzi et al. | |
| 8,806,627 B1 | 8/2014 | Aharoni | |
| 8,843,820 B1 | 9/2014 | Kay | |
| 8,849,985 B1 | 9/2014 | Colton | |
| 8,855,143 B1* | 10/2014 | Acampora | H04L 69/321 370/477 |
| 8,869,281 B2 | 10/2014 | Call | |
| 8,892,687 B1 | 11/2014 | Call | |
| 8,954,583 B1 | 2/2015 | Zhou | |
| 8,997,226 B1 | 3/2015 | Call | |
| 9,043,924 B2 | 5/2015 | Maor | |
| 9,075,990 B1 | 7/2015 | Yang | |
| 9,158,893 B2 | 10/2015 | Call | |
| 9,225,729 B1 | 12/2015 | Moen | |
| 9,225,737 B2 | 12/2015 | Call | |
| 9,258,328 B2 | 2/2016 | Ibatullin et al. | |
| 9,275,222 B2 | 3/2016 | Yang | |
| 9,338,143 B2 | 5/2016 | Hansen | |
| 9,356,954 B2 | 5/2016 | Zhou | |
| 9,456,050 B1 | 9/2016 | Lepeska | |
| 9,609,006 B2 | 3/2017 | Call | |
| 9,628,498 B1 | 4/2017 | Aziz | |
| 9,639,699 B1 | 5/2017 | Kurupati | |
| 9,646,140 B2 | 5/2017 | Horadan | |
| 9,680,850 B2 | 6/2017 | Rapaport | |
| 9,686,300 B1 | 6/2017 | Kurupati | |
| 9,705,902 B1 | 7/2017 | Call | |
| 9,712,561 B2 | 7/2017 | Zhou | |
| 9,906,544 B1 | 2/2018 | Kurupati | |
| 2002/0188631 A1 | 12/2002 | Tiemann | |
| 2002/0199116 A1 | 12/2002 | Hoene et al. | |
| 2003/0159063 A1 | 8/2003 | Apfelbaum | |
| 2004/0088651 A1 | 5/2004 | McKnight et al. | |
| 2005/0108554 A1 | 5/2005 | Rubin | |
| 2005/0216770 A1 | 5/2005 | Rowett et al. | |
| 2005/0172338 A1 | 8/2005 | Sandu | |
| 2005/0198099 A1 | 9/2005 | Motsinger | |
| 2005/0240999 A1 | 10/2005 | Rubin et al. | |
| 2005/0251536 A1 | 11/2005 | Harik | |
| 2006/0053295 A1 | 3/2006 | Madhusudan et al. | |
| 2006/0085541 A1* | 4/2006 | Cuomo | H04L 41/083 709/224 |
| 2006/0101047 A1 | 5/2006 | Rice | |
| 2006/0174323 A1 | 8/2006 | Brown | |
| 2006/0212932 A1 | 9/2006 | Patrick | |
| 2006/0230288 A1 | 10/2006 | Fox | |
| 2006/0288418 A1 | 12/2006 | Yang et al. | |
| 2007/0011295 A1 | 1/2007 | Hansen | |
| 2007/0064617 A1 | 3/2007 | Reves | |
| 2007/0074227 A1 | 3/2007 | Naidu et al. | |
| 2007/0088955 A1 | 4/2007 | Lee | |
| 2007/0234070 A1 | 10/2007 | Horning | |
| 2007/0245027 A1 | 10/2007 | Ghosh | |
| 2008/0208785 A1 | 8/2008 | Trefler | |
| 2008/0222736 A1 | 9/2008 | Boodaei et al. | |
| 2008/0250310 A1 | 10/2008 | Chen | |
| 2009/0070459 A1 | 3/2009 | Cho et al. | |
| 2009/0099988 A1 | 4/2009 | Stokes et al. | |
| 2009/0193513 A1 | 7/2009 | Agarwal et al. | |
| 2009/0199297 A1 | 8/2009 | Jarrett | |
| 2009/0204820 A1 | 8/2009 | Brandenburg | |
| 2009/0216882 A1 | 8/2009 | Britton | |
| 2009/0241174 A1 | 9/2009 | Rajan et al. | |
| 2009/0249310 A1 | 10/2009 | Meijer et al. | |
| 2009/0282062 A1 | 11/2009 | Husic | |
| 2009/0292984 A1 | 11/2009 | Bauchot et al. | |
| 2010/0088404 A1 | 4/2010 | Mani | |
| 2010/0100927 A1 | 4/2010 | Bhola et al. | |
| 2010/0106611 A1 | 4/2010 | Paulsen | |
| 2010/0142382 A1 | 6/2010 | Jungck et al. | |
| 2010/0186089 A1 | 7/2010 | Fu | |
| 2010/0218253 A1 | 8/2010 | Sutton | |
| 2010/0235637 A1 | 9/2010 | Lu et al. | |
| 2010/0235910 A1 | 9/2010 | Ku et al. | |
| 2010/0240449 A1 | 9/2010 | Corem | |
| 2010/0257354 A1 | 10/2010 | Johnston et al. | |
| 2010/0262780 A1 | 10/2010 | Mahan et al. | |
| 2010/0287132 A1 | 11/2010 | Hauser | |
| 2011/0015917 A1 | 1/2011 | Wang et al. | |
| 2011/0022846 A1 | 1/2011 | Ginter et al. | |
| 2011/0035733 A1 | 2/2011 | Horning | |
| 2011/0047169 A1 | 2/2011 | Leighton et al. | |
| 2011/0131416 A1 | 6/2011 | Schneider | |
| 2011/0154021 A1 | 6/2011 | McCann et al. | |
| 2011/0154308 A1 | 6/2011 | Lobo | |
| 2011/0178973 A1 | 7/2011 | Lopez et al. | |
| 2011/0225234 A1 | 9/2011 | Amit | |
| 2011/0231305 A1 | 9/2011 | Winters | |
| 2011/0296391 A1 | 12/2011 | Gass et al. | |
| 2011/0320816 A1 | 12/2011 | Yao et al. | |
| 2012/0011262 A1 | 1/2012 | Cheng et al. | |
| 2012/0022942 A1 | 1/2012 | Holloway | |
| 2012/0036576 A1 | 2/2012 | Iyer | |
| 2012/0090030 A1 | 4/2012 | Rapaport | |
| 2012/0096116 A1 | 4/2012 | Mislove et al. | |
| 2012/0124372 A1 | 5/2012 | Dilley | |
| 2012/0198528 A1 | 8/2012 | Baumhof | |
| 2012/0216251 A1 | 8/2012 | Kumar et al. | |
| 2012/0254727 A1 | 10/2012 | Jain | |
| 2012/0255006 A1 | 10/2012 | Aly et al. | |
| 2012/0324236 A1 | 12/2012 | Srivastava | |
| 2013/0031037 A1 | 1/2013 | Brandt | |
| 2013/0047255 A1 | 2/2013 | Dalcher | |
| 2013/0086679 A1 | 4/2013 | Beiter | |
| 2013/0091582 A1 | 4/2013 | Chen et al. | |
| 2013/0198607 A1 | 8/2013 | Mischook et al. | |
| 2013/0219256 A1 | 8/2013 | Lloyd et al. | |
| 2013/0227397 A1 | 8/2013 | Tvorun et al. | |
| 2013/0232234 A1 | 9/2013 | Kapur et al. | |
| 2013/0263264 A1 | 10/2013 | Klein et al. | |
| 2013/0273882 A1 | 10/2013 | Walsh | |
| 2013/0340043 A1 | 12/2013 | Zarei et al. | |

(56) References Cited

U.S. PATENT DOCUMENTS

| | | |
|---|---|---|
| 2014/0040051 A1 | 2/2014 | Ovick |
| 2014/0040787 A1 | 2/2014 | Mills et al. |
| 2014/0281535 A1 | 2/2014 | Kane et al. |
| 2014/0089786 A1 | 3/2014 | Hashmi |
| 2014/0096194 A1 | 4/2014 | Bhogavilli |
| 2014/0289830 A1 | 9/2014 | Lemaster |
| 2014/0298469 A1 | 10/2014 | Marion |
| 2014/0304816 A1 | 10/2014 | Klein |
| 2014/0310392 A1 | 10/2014 | Ho |
| 2014/0379902 A1 | 12/2014 | Wan |
| 2015/0058992 A1 | 2/2015 | El-Moussa |
| 2015/0067031 A1 | 3/2015 | Acharya |
| 2015/0067866 A1 | 3/2015 | Ibatullin |
| 2015/0112892 A1 | 4/2015 | Kaminsky |
| 2015/0163201 A1 | 6/2015 | Call et al. |
| 2015/0256556 A1 | 9/2015 | Kaminsky |
| 2015/0262183 A1 | 9/2015 | Gervais |
| 2015/0278491 A1 | 10/2015 | Horning |
| 2015/0341385 A1 | 11/2015 | Sivan |
| 2015/0358338 A1 | 12/2015 | Zeitlin |
| 2015/0379266 A1 | 12/2015 | McLaughlin |
| 2016/0005029 A1 | 1/2016 | Ivey |
| 2016/0072829 A1 | 3/2016 | Call |
| 2016/0119344 A1 | 4/2016 | Freitas Fortuna dos Santos |
| 2016/0142438 A1 | 5/2016 | Pastore |
| 2016/0182537 A1 | 6/2016 | Tatourian |
| 2016/0342793 A1 | 11/2016 | Hidayat |
| 2016/0344769 A1 | 11/2016 | Li |
| 2016/0359901 A1 | 12/2016 | Yang |
| 2017/0012960 A1 | 1/2017 | Idika |
| 2017/0013012 A1 | 1/2017 | Hansen |
| 2017/0048260 A1 | 2/2017 | Peddemors |
| 2017/0063923 A1 | 3/2017 | Yang |
| 2017/0118241 A1 | 4/2017 | Call |
| 2017/0201540 A1 | 7/2017 | Call |
| 2017/0235954 A1 | 8/2017 | Kurupati |
| 2017/0237766 A1 | 8/2017 | Mattson |
| 2017/0257383 A1 | 9/2017 | Ficarra |
| 2017/0257385 A1 | 9/2017 | Overson |
| 2017/0293748 A1 | 10/2017 | Kurupati |
| 2018/0041527 A1 | 2/2018 | Call |
| 2018/0144133 A1 | 5/2018 | Hoover |
| 2018/0152436 A1 | 5/2018 | Yang |
| 2018/0205747 A1 | 7/2018 | Ficarra |
| 2018/0212993 A1 | 7/2018 | Call |
| 2018/0227325 A1 | 8/2018 | Zhou |
| 2018/0248913 A1 | 8/2018 | Yang |
| 2018/0255154 A1 | 9/2018 | Li |
| 2018/0270256 A1 | 9/2018 | Call |

FOREIGN PATENT DOCUMENTS

| | | |
|---|---|---|
| WO | WO1999064967 | 12/1999 |
| WO | WO2000/72119 | 11/2000 |
| WO | WO2002/093369 | 11/2002 |
| WO | WO2002088951 | 11/2002 |
| WO | WO2004109532 | 12/2004 |
| WO | WO2008095018 | 8/2008 |
| WO | WO2008095031 | 8/2008 |
| WO | WO2008130946 | 10/2008 |
| WO | WO2010/046314 | 4/2010 |
| WO | WO2013091709 | 6/2013 |
| WO | WO 2017/007705 | 1/2017 |
| WO | WO 2017/007936 | 1/2017 |
| WO | 2017/040453 | 3/2017 |
| WO | WO 2017/074622 | 5/2017 |
| WO | PCT/US2016/049357 | 3/2018 |

OTHER PUBLICATIONS

CodeSealer, "CodeSealer," codesealer.com [online] 2013 [captured Aug. 29, 2013]. Retrieved from the Internet: <URL: http://web.archive.org/web/20130829165031/http://codesealer.com/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

Currie et al., "In-the-wire authentication: Protecting client-side critical data fields in secure network transactions," 2nd International Conference on Adaptive Science and Technology, 2009, pp. 232-237.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/24002/>, 18 pages.

Hofmeyr et al., Intrusion Detection using Sequence of System calls, Journal of Computer Security 6(1998).

Li et al., "WebShield: Enabling various web defense techniques without client side modifications," In Proceedings of the 18th Annual Network and Distributed System Security Symposium (NDSS), 2011, 18 pages.

Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.

Matsunaka et al., "Detecting and Preventing Drive-By Download Attack via Participative Monitoring of the Web," in Information Security (Asia JCIS), 2013 Eighth Asia Joint Conference on Information Security, pp. 48-55. doi: 10.1109/ASIAJCIS.2013.15.

Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.

Pattabiraman and Zorn, "DoDOM: Leveraging DOM Invariants for Web 2.0 Application Robustness Testing," 2010 IEEE 21st International Symposium on Software Reliability Engineering, pp. 191-200.

Rieck et al. "Cujo: Efficient Detection and Prevention of Drive-by-Download Attacks," ACSAC 2010, Austin, Texas, Dec. 6-10, 9 pages.

RSA, "RSA Offers Advanced Solutions to Help Combat Man-In-The-Browser Attacks," rsa.com [online] May 18, 2010 [captured Nov. 11, 2011]. Retrieved from the Internet: <URL: http://web.archive.org/web/20111111123108/http://rsa.com/press_release.aspx?id=10943>, 3 pages.

Rutkowska, "Rootkits vs. Stealth by Design Malware," Black Hat Europe, 2006. Retrieved from the Internet: <URL: http://www.blackhat.com/presentations/bh-europe-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.

Sedaghat et al., "On-the-fly web content integrity check boosts users' confidence"; Nov. 2002; Communications of the ACM, vol. 45 Issue 11; Publisher: ACM; pp. 33-37.

Sood and Enbody. "A Browser Malware Taxonomy," Virus Bulletin, Jun. 2011. Retrieved from the Internet: <URL: http://www.secniche.org/released/VB_BRW_TAX_AKS_RJE.pdf>, 5 pages.

Sood and Enbody, "Browser Exploit Packs—Explotation Tactics," Virus Bulletin Conference, Oct. 2011, Retrieved from the Internet: <URL: http://www.secniche.org/papers/VB_2011_BRW_EXP_PACKS_AKS_RJE.pdf>, 9 pages.

Sood et al., "The Art of Stealing Banking Information—Form grabbing on Fire," Virus Bulletin, Nov. 2011, Retrieved from the

(56) References Cited

OTHER PUBLICATIONS

Internet: <URL: http://www.virusbtn.com/virusbulletin/archive/2011/11/vb201111-form-grabbing>, 5 pages.
Team Cymru, "Cybercrime—an Epidemic," Queue, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.
Trusteer, "Trusteer Rapport for Online Banking," [online] 2013 [captured May 11, 2013]. Retrieved from the Internet: <URL: http://web.archive.org/web/20130511162210/http://www.trusteer.com/products/trusteer-rapport-for-online-banking>, 2 pages.
Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.
CTFR, dated Aug. 14, 2017, re: Marc R. Hansen, U.S. Appl. No. 15/148,139, filed May 6, 2016.
CTNF, dated Aug. 11, 2017, re: Oscar H. Steele III, U.S. Appl. No. 15/224,985, filed Aug. 1, 2016.
NOA, dated Aug. 29, 2017, re: Siying Yang, U.S. Appl. No. 15/052,951, filed Feb. 25, 2016.
NOA, dated Aug. 29, 2017, re: Roger S. Hoover, U.S. Appl. No. 14/713,493, filed May, 15, 2015.
CTNF, dated Aug. 30, 2017, re: Justin D. Call, U.S. Appl. No. 15/470,715, filed Mar. 27, 2017.
CTNF, dated Aug. 4, 2017, re: Siying Yang, U.S. Appl. No. 15/242,062, filed Aug. 19, 2016.
CTFR, dated Sep. 5, 2017, re: Siying Yang, U.S. Appl. No. 14/925,547, filed Oct. 28, 2015.
CTNF, dated Oct. 19, 2017, re: Jarrod S. Overson, U.S. Appl. No. 15/059,080, filed Mar. 2, 2016.
CTNF, dated Oct. 19, 2017, re: Wesley Hales, U.S. Appl. No. 15/011,237, filed Jan. 29, 2016.
CTNF, dated Oct. 6, 2017, re: Wesley Hales, U.S. Appl. No. 14/849,459, filed Sep. 9, 2015.
NOA, dated Oct. 25, 2017, re: Michael J. Ficarra, U.S. Appl. No. 15/060,322, filed Mar. 3, 2016.
CTNF, dated Nov. 13, 2017, re: Nwokedi Idika, U.S. Appl. No. 14/728,596, filed Jun. 2, 2015.
CTFR, dated Oct. 5, 2017, re: Justin D. Call, U.S. Appl. No. 14/922,436, filed Oct. 26, 2015.
NOA, dated Oct. 11, 2017, re: James D. Call, U.S. Appl. No. 14/822,287, filed Aug. 10, 2015.
NOA, dated Oct. 18, 2017, re: Roger S. Hoover, U.S. Appl. No. 14/470,082, filed Aug. 27, 2014.
NOA, dated Oct. 10, 2017, re: Roger S. Hoover, U.S. Appl. No. 14/713,493, filed May 15, 2015.
CTNF, dated Feb. 17, 2017, re: Siying Yang, U.S. Appl. No. 15/235,909, filed Aug. 12, 2016.
NOA, dated Feb. 16, 2017, re: Justin D. Call, U.S. Appl. No. 14/822,287, filed Aug. 10, 2015.
NOA, dated Mar. 2, 2017, re: Justin D. Call, U.S. Appl. No. 14/930,198, filed Nov. 2, 2015.
CTNF, dated Nov. 30, 2016, re: Siying Yang, U.S. Appl. No. 14/841,013, filed Aug. 31, 2015.
NOA, dated Mar. 10, 2017, re: Roger S. Hoover, U.S. Appl. No. 14/470,082, filed Aug. 27, 2014.
CTNF, dated Mar. 10, 2017, re: Justin D. Call, U.S. Appl. No. 14/922,436, filed Oct. 26, 2015.
CTNF, dated Mar. 9, 2017, re: Siying Yang, U.S. Appl. No. 14/925,547, filed Oct. 28, 2015.
NOA, dated Mar. 16, 2017 re: Siying Yang, U.S. Appl. No. 15/052,951, filed Feb. 25, 2016.
NOA, dated Apr. 23, 2015, re: Justin Call, U.S. Appl. No. 13/527,025, filed Jun. 19, 2012.
CTFR, dated Feb. 10, 2015, re: Justin Call, U.S. Appl. No. 13/527,025, filed Jun. 19, 2012.
CTNF, dated Nov, 2, 2012, re: Justin Call, U.S. Appl. No. 13/527,025, filed Jun. 19, 2012.
CTFR, dated Apr. 23, 2013, re: Justin Call, U.S. Appl. No. 13/527,025, filed Jun. 19, 2012.
CTNF, dated Aug. 4, 2014, re: Justin Call, U.S. Appl. No. 13/527,025, filed Jun. 19, 2012.
NOA, dated Jun. 1, 2015, re: Justin Call, U.S. Appl. No. 13/527,025, filed Jun. 19, 2012.
CTNF, dated Feb. 26, 2015, re: Justin Call, U.S. Appl. No. 14/055,576, filed Oct. 16, 2016.
NOA, dated Aug. 21, 2015, re: Justin Call, U.S. Appl. No. 14/055,576, filed Oct. 16, 2013.
CTNF, dated Dec. 24, 2014, re: Justin Call, U.S. Appl. No. 14/055,583, filed Oct. 16, 2013.
NOA, dated Jun. 19, 2015, re: Justin Call, U.S. Appl. No. 14/055,583, filed Oct. 16, 2013.
CTNF, dated Dec. 24, 2013, re: Justin Call, U.S. Appl. No. 14/055,646, filed Oct. 16, 2013.
CTFR, dated May 27, 2014, re: Justin Call, U.S. Appl. No. 14/055,646, filed Oct. 16, 2013.
NOA, dated Aug. 12, 2014, re: Justin Call, U.S. Appl. No. 14/055,646, filed Oct. 16, 2013.
NOA, dated Sep. 4, 2014, re: Justin Call, U.S. Appl. No. 14/055,646, filed Oct. 16, 2013.
CTFR, dated Apr. 9, 2015, re: Justin Call, U.S. Appl. No. 14/055,704, filed Oct. 16, 2013.
CTNF, dated Dec. 4, 2014, re: Justin Call, U.S. Appl. No. 14/055,704, filed Oct. 16, 2013.
CTNF, dated Dec. 30, 2013, re: Justin Call, U.S. Appl. No. 14/055,704, filed Oct. 16, 2013.
CTFR, dated Apr. 22, 2014, re: Justin Call, U.S. Appl. No. 14/055,704, filed Oct. 16, 2013.
CTFR, dated Sep. 25, 2015, re: Marc Hansen, U.S. Appl. No. 14/055,714, filed Oct. 16, 2013.
CTNF, dated Mar. 16, 2015, re: Marc Hansen, U.S. Appl. No. 14/055,714, filed Oct. 16, 2013.
NOA, dated Jan. 13, 2016, re: Marc Hansen, U.S. Appl. No. 14/055,714, filed Oct. 16, 2013.
NOA, dated Jan. 25, 2016, re: Justin Call, U.S. Appl. No. 14/099,437, filed Dec. 6, 2013.
NOA, dated Aug. 3, 2015, re: Justin Call, U.S. Appl. No. 14/099,437, filed Dec. 6, 2013.
CTNF, dated May 20, 2015, re: Justin Call, U.S. Appl. No. 14/110,659, filed Oct. 8, 2013.
CTNF, dated Jun. 10, 2014, re: Xiaoming Zhou, U.S. Appl. No. 14/159,374, filed Jan. 20, 2014.
NOA, dated Sep. 25, 2014, re: Xiaoming Zhou, U.S. Appl. No. 14/159,374, filed Jan. 20, 2014.
NOA, dated Nov. 10, 2014, re: Xioaming Zhou, U.S. Appl. No. 14/159,374, filed Jan. 20, 2014.
CTNF, dated Apr. 10, 2014, re: Oscar Steele, U.S. Appl. No. 14/160,105, filed Jan. 21, 2014.
NOA, dated Oct. 17, 2014, re: Oscar Steele, U.S. Appl. No. 14/160,105, filed Jan. 21, 2014.
NOA, dated Aug. 19, 2015, re: Daniel Moen, U.S. Appl. No. 14/160,107, filed Jan. 21, 2014.
CTFR, dated Nov. 6, 2014, re: Justin Call, U.S. Appl. No. 14/160,126, filed Jan. 21, 2014.
CTNF, dated May 23, 2014, re: Justin Call, U.S. Appl. No. 14/160,126, filed Jan. 21, 2014.
NOA, dated Feb. 20, 2015, re: Justin Call, U.S. Appl. No. 14/160,126, filed Jan. 21, 2014.
NOA, dated May 27, 2014, re: Justin Call, U.S. Appl. No. 14/175,923 filed Feb. 7, 2014.
NOA, dated Sep. 11, 2014, re: Justin Call, U.S. Appl. No. 14/175,923, filed Feb. 7, 2014.
NOA, dated Oct. 15, 2014, re: Justin Call, U.S. Appl. No. 14/175,923, filed Feb. 7, 2014.
CTNF, dated Jun. 27, 2014, re: Justin Call, U.S. Appl. No. 14/255,248, filed Apr. 17, 2014.
NOA, dated Nov. 19, 2014, re: Justin Call, U.S. Appl. No. 14/255,248, filed Apr. 17, 2014.
NOA, dated Dec. 24, 2014, re: Justin Call, U.S. Appl. No. 14/255,248, filed Apr. 17, 2014.

(56) References Cited

OTHER PUBLICATIONS

CTNF, dated Jan. 20, 2016, re: Shishir K. Ramam, U.S. Appl. No. 14/259,869, filed Apr. 23, 2014.
NOA, dated Jun. 21, 2016, re: Shishir K. Ramam, U.S. Appl. No. 14/259,869, filed Apr. 23, 2014.
CTFR, dated Apr. 20, 2016, re: Xinran Wang, U.S. Appl. No. 14/286,324, filed May 23, 2014.
CTNF, dated Aug. 31, 2015, re: Xinran Wang, U.S. Appl. No. 14/286,324, filed May 23, 2014.
CTFR, dated Dec. 2, 2015, re: Xinran Wang, U.S. Appl. No. 14/286,733, filed May 23, 2014.
CTNF, dated May 27, 2015, re: Xinran Wang, U.S. Appl. No. 14/286,733, filed May 23, 2014.
CTFR, dated Jan. 23, 2015, re: Xinran Wang, U.S. Appl. No. 14/286,733, filed May 23, 2014.
CTNF, dated Jul. 14, 2014, re: Xinran Wang, U.S. Appl. No. 14/286,733, filed May 23, 2014.
NOA, dated May 4, 2016, re: Xinran Wang, U.S. Appl. No. 14/286,733, filed May 23, 2014.
CTNF, dated Sep. 1, 2015, re: Ariya Hidayat, U.S. Appl. No. 14/293,895, filed Jun. 2, 2014.
NOA, dated Mar. 30, 2016, re: Ariya Hidayat, U.S. Appl. No. 14/293,895, filed Jun. 2, 2014.
CTNF, dated Oct. 9, 2014, re: Siying Yang, U.S. Appl. No. 14/321,172, filed Jul. 1, 2014.
NOA, dated Mar. 30, 2015, re: Siying Yang, U.S. Appl. No. 14/321,172, filed Jul. 1, 2014.
NOA, dated Oct. 12, 2016, re: Siying Yang, U.S. Appl. No. 14/329,718, filed Jul. 11, 2014.
NOA, dated Aug. 15, 2016, re: Siying Yang, U.S. Appl. No. 14/329,718, filed Jul. 11, 2014.
CTFR, dated May 6, 2016, re: Siying Yang, U.S. Appl. No. 14/329,718, filed Jul. 11, 2014.
CTNF, dated Feb. 3, 2016, re: Siying Yang, U.S. Appl. No. 14/329,718, filed Jul. 11, 2014.
CTFR, dated Feb. 20, 2015, re: Siying Yang, U.S. Appl. No. 14/329,718, filed Jul. 11, 2014.
CTNF, dated Oct. 30, 2014, re: Siying Yang, U.S. Appl. No. 14/329,718, filed Jul. 11, 2014.
NOA, dated Sep. 15, 2015, re: Siying Yang, U.S. Appl. No. 14/329,718, filed Jul. 11, 2014.
NOA, dated Nov. 3, 2016, re: Siying Yang, U.S. Appl. No. 14/329,718, filed Jul. 11, 2014.
NOA, dated Jan. 18, 2017, re: Siying Yang, U.S. Appl. No. 14/329,718, filed Jul. 11, 2014.
CTNF, dated Sep. 30, 2014, re: Siying Yang, U.S. Appl. No. 14/338,207, filed Jul. 22, 2014.
NOA, dated Nov. 7, 2014, re: Siying Yang, U.S. Appl. No. 14/338,207, filed Jul. 22, 2014.
NOA, dated Jan. 6, 2015, re: Siying Yang, U.S. Appl. No. 14/338,207, filed Jul. 22, 2014.
CTNF, dated Jun. 24, 2016, re: Roger Hoover, U.S. Appl. No. 14/470,082, filed Aug. 27, 2014.
CTNF, dated Aug. 28, 2015, re: Roger Hoover, U.S. Appl. No. 14/470,082, filed Aug. 27, 2014.
CTNF, dated Dec. 1, 2016, re: Oscar Steele, U.S. Appl. No. 14/481,663, filed Sep. 9, 2014.
NOA, dated Apr. 27, 2016, re: Siying Yang, U.S. Appl. No. 14/481,835, filed Sep. 9, 2014.
CTNF, dated Oct. 28, 2015, re: Siying Yang, U.S. Appl. No. 14/481,835, filed Sep. 9, 2014.
NOA, dated May 24, 2016, re: Siying Yang, U.S. Appl. No. 14/481,835, filed Sep. 9, 2014.
NOA, dated Jul. 25, 2016, re: Siying Yang, U.S. Appl. No. 14/481,835, filed Sep. 9, 2014.
CTNF, dated Apr. 8, 2016, re: Ariya Hidayat, U.S. Appl. No. 14/481,867, filed Sep. 9, 2014.
CTFR, dated Sep. 6, 2016, re: Ariya Hidayat, U.S. Appl. No. 14/481,867, filed Sep. 9, 2014.
NOA, dated Dec. 16, 2016, re: Ariya Hidayat, U.S. Appl. No. 14/481,867, filed Sep. 9, 2014.
CTNF, dated Jan. 2, 2015, re: Timothy Peacock, U.S. Appl. No. 14/503,346, filed Sep. 30, 2014.
NOA, dated Apr. 10, 2015, re: Timothy Peacock, U.S. Appl. No. 14/503,346, filed Sep. 30, 2014.
NOA, dated Jul. 21, 2016, re: Siying Yang, U.S. Appl. No. 14/451,062, filed Nov. 13, 2014.
CTNF, dated Feb. 23, 2016, re: Siying Yang, U.S. Appl. No. 14/541,062, filed Nov. 13, 2014.
CTNF, dated Dec. 14, 2015, re: Oscar Steele, U.S. Appl. No. 14/542,994, filed Nov. 17, 2014.
NOA, dated Mar. 28, 2016, re: Oscar Steele, U.S. Appl. No. 14/542,994, filed Nov. 17, 2014.
CTFR, dated Dec. 28, 2016, re: Siying Yang, U.S. Appl. No. 14/570,466, filed Dec. 15, 2014.
CTNF, dated Apr. 21, 2016, re: Siying Yang, U.S. Appl. No. 14/570,466, filed Dec. 15, 2014.
CTNF, dated May 8, 2015, re: Timothy Peacock, U.S. Appl. No. 14/570,632, filed Dec. 15, 2014.
NOA, dated Dec. 18, 2015, re: Timothy Peacock, U.S. Appl. No. 14/570,632, filed Dec. 15, 2014.
CTNF, dated Apr. 22, 2016, re: Justin Call, U.S. Appl. No. 14/602,038, filed Jan. 21, 2015.
NOA, dated Sep. 19, 2016, re: Justin Call, U.S. Appl. No. 14/602,038, filed Jan. 21, 2015.
NOA, dated Mar. 16, 2016, re: Xiaoming Zhou, U.S. Appl. No. 14/618,389, filed Feb. 10, 2015.
Now, dated Apr. 12, 2016, re: Xiaoming Zhou, U.S. Appl. No. 14/618,389, filed Feb. 10, 2015.
CTFR, dated Jan. 15, 2016, re: Xiaoming Zhou, U.S. Appl. No. 14/618,389, filed Feb. 10, 2015.
CTNF, dated Oct. 5, 2015, re: Xiaoming Zhou, U.S. Appl. No. 14/618,389, filed Feb. 10, 2015.
CTNF, dated Mar. 17, 2016, re: Justin Call, U.S. Appl. No. 14/672,879, filed Mar. 30, 2015.
CTFR, dated Mar. 30, 2016, re: Siying Yang, U.S. Appl. No. 14/679,596, filed Apr. 6, 2015.
CTNF, dated Nov. 4, 2015, re: Siying Yang, U.S. Appl. No. 14/679,596, filed Apr. 6, 2015.
NOA, dated Jul. 18, 2016, re: Siying Yang, U.S. Appl. No. 14/679,596, filed Apr. 6, 2015.
CTFR, dated May 19, 2016, re: Justin Call, U.S. Appl. No. 14/702,140, filed May 1, 2015.
CTNF, dated Oct. 23, 2015, re: Justin Call, U.S. Appl. No. 14/702,140, filed May 1, 2015.
CTFR, dated Jul. 15, 2016, re: Justin Call, U.S. Appl. No. 14/702,349, filed May 1, 2015.
CTNF, dated Feb. 1, 2016 re: Justin Call, U.S. Appl. No. 14/702,349, filed May 1, 2015.
NOA, dated Oct. 24, 2016, re: Justin Call, U.S. Appl. No. 14/702,349, filed May 1, 2015.
CTNF, dated Oct. 7, 2016, re: Roger Hoover, U.S. Appl. No. 14/713,493, filed May 15, 2015.
CTNF, dated Nov. 10, 2016, re: Nwokedi Idika, U.S. Appl. No. 14/728,621, filed Jun. 2, 2015.
NOA, dated Oct. 23, 2015, re: Siying Yang, U.S. Appl. No. 14/790,738, filed Jul. 2, 2015.
CTNF, dated Jul. 18, 2016, re: Justin Call, U.S. Appl. No. 14/822,287, filed Aug. 10, 2015.
CTNF, dated Mar. 14, 2016, re: Justin Call, U.S. Appl. No. 14/874,717, filed Oct. 5, 2015.
NOA, dated Apr. 28, 2016, re: Justin Call, U.S. Appl. No. 14/874,717, filed Oct. 5, 2015.
CTNF, dated Oct. 19, 2016, re: Justin Call, U.S. Appl. No. 14/929,019, filed Oct. 30, 2015.
NOA, dated Nov. 9, 2016, re: Justin Call, U.S. Appl. No. 14/930,198, filed Nov. 2, 2015.
CTNF, dated Jul. 21, 2016, re: Justin Call, U.S. Appl. No. 14/930,198, filed Nov. 2, 2015.
CTFR, dated Sep. 9, 2016, re: Siying Yang, U.S. Appl. No. 14/968,460, filed Dec. 14, 2015.

(56) References Cited

OTHER PUBLICATIONS

CTNF, dated Apr. 8, 2016, re: Siying Yang, U.S. Appl. No. 14/968,460, filed Dec. 14, 2015.
NOA, dated Nov. 16, 2016, re: Justin Call, U.S. Appl. No. 14/980,408, filed Dec. 28, 2015.
CTNF, dated Aug. 2, 2016, re: Justin Call, U.S. Appl. No. 14/980,409, filed Dec. 28, 2015.
CTNF, dated Oct. 7, 2016, re: Siying Yang, U.S. Appl. No. 15/052,951, filed Feb. 25, 2016.
NOA, dated Mar. 29, 2017, re: Siying Yang, U.S. Appl. No. 15/052,951, filed Feb. 25, 2016.
NOA, dated Apr. 11, 2017, re: Siying Yang, U.S. Appl. No. 15/052,951, filed Feb. 25, 2016.
CTNF, dated Dec. 16, 2016, re: Marc Hansen, U.S. Appl. No. 15/148,139, filed May 6, 2016.
CTFR, dated Feb. 6, 2017, re: Xiaoming Zhou, U.S. Appl. No. 15/157,704, filed May 18, 2016.
CTNF, dated Oct. 6, 2016, re: Xiaoming Zhou, U.S. Appl. No. 15/157,704, filed May 18, 2016.
NOA, dated Mar. 7, 2017, re: Xiaoming Zhou, U.S. Appl. No. 15/157,704, filed May 18, 2016.
CTFR, dated Nov. 18, 2016, re: Justin D. Call, U.S. Appl. No. 14/672,879, filed Mar. 30. 2015.
CTNF, dated Jun. 1, 2017, re: Siying Yang, U.S. Appl. No. 14/942,769, filed Nov. 16, 2015.
CTNF, dated May 22, 2017, re: Siying Yang, U.S. Appl. No. 14/329,718, filed Jul. 11, 2014.
NOA, dated May 22, 2017, re: Roger S. Hoover, U.S. Appl. No. 14/713,493, filed May 15, 2015.
NOA, dated Jun. 7, 2017, re: Call, et al., U.S. Appl. No. 14/930,198, filed Jun. 7, 2017.
CTNF, dated Jun. 2, 2017, re: Ariya Hidaya, U.S. Appl. No. 15/224,978, filed Aug. 1, 2016.
NOA, dated Jun. 30, 2017, re: Roger S. Hoover, U.S. Appl. No. 14/713,493, filed May 15, 2015.
CTNF, dated Apr. 7, 2017, re: Yao Zhao, U.S. Appl. No. 14/861,906, filed Sep. 22, 2015.
CTNF, dated May 25, 2017, re: Daniel G. Moen, U.S. Appl. No. 14/980,231, filed Dec. 28, 2015.
CTFR, dated Jun. 6, 2017, re: Siying Yang, U.S. Appl. No. 15/235,909, filed Aug. 12, 2016.
NOA, dated Jun. 20, 2017, re: Roger S. Hoover, U.S. Appl. No. 14/470,082, filed Aug. 27, 2014.
CTNF, dated Jul. 26, 2017, re: Bei Zhang, U.S. Appl. No. 14/859,084, filed Sep. 18, 2015.
NOA, dated Jul. 13, 2017, re: Xinran Wang, U.S. Appl. No. 14/286,324, filed May 23, 2014.
NOA, dated Jun. 27, 2017, re: Siying Yang, U.S. Appl. No. 14/841,013, filed Aug. 31, 2015.
NOA, dated Jun. 20, 2017, re: Siying Yang, U.S. Appl. No. 15/052,951, filed Feb. 25, 2016.
CTNF, dated Jun. 21, 2017, re: Zhiwei Li, U.S. Appl. No. 14/718,736, filed May 21, 2015.
CTNF, dated Jul. 28, 2017, re: Xinran Wang, U.S. Appl. No. 15/230,540, filed Aug. 8, 2016.
NOA, dated Aug. 4, 2017, re: Justin Call, U.S. Appl. No. 14/929,019, filed Oct. 30, 2015.
EP App. No. 14730229.3, Intention to Grant, EP, Call et al., dated May 23, 2017.
Examination Report No. 1 for Standard Patent Application, App. No. 2014237025, AU, Call, Justin D, dated Sep. 25, 2014.
International Preliminary Report on Patentability, dated Jun. 16, 2016, PCT/US14/68133.
International Search Report, dated Apr. 7, 2015, PCT/US14/68133.
International Search Report, dated Jul. 28, 2015, PCT/US15/31361.
International Search Report, dated Apr. 9, 2015, PCT/US15/12072.
International Preliminary Report on Patentability, dated Nov. 30, 2015, PCT/US15/12072.
International Search Report, dated Jan. 21, 2015, PCT/US14/23635.
International Search Report, dated Sep. 22, 2016, PCT/US16/40645.
International Search Report, dated Feb. 16, 2017, PCT/US16/53472.
International Search Report, dated Dec. 30, 2016, PCT/US16/53392.
International Search Report, dated Nov. 21, 2016, PCT/US16/49357.
International Search Report, dated Oct. 11, 2016, PCT/US16/41337.
International Search Report, dated Jul. 1, 2016, PCT/US16/25092.
International Search Report, dated Aug. 14, 2014, PCT/US14/27805.
International Search Report, dated Aug. 1, 2014, PCT/US14/24232.
International Search Report, dated Jul. 18, 2014, PCT/US14/23897.
International Search Report, dated Jun. 3, 2013, PCT/US13/26516.
CTNF, dated Jul. 12, 2018, re: Justin D. Call, U.S. Appl. No. 14/922,436, filed Oct. 26, 2015.
CTNF, dated Jun. 29, 2018, re: Timothy Dylan Peacock, U.S. Appl. No. 15/137,824, filed Apr. 25, 2016.
CTNF, dated Dec. 13, 2017, re: Justin D. Call, U.S. Appl. No. 15/645,787, filed Jul. 10, 2017.
NOA, dated Dec. 18, 2017, re: Yao Zhao, U.S. Appl. No. 14/861,906, filed Sep. 22, 2015.
NOA, dated Jan. 5, 2018, re: Yao Zhao, U.S. Appl. No. 14/861,906, filed Sep. 22, 2015.
NOA, dated Jan. 9, 2018, re: Justin D. Call, U.S. Appl. No. 15/470,715 filed Mar. 27, 2017.
NOA, dated Jan. 16, 2018, re: Justin D. Call, U.S. Appl. No. 14/822,287, filed Aug. 10, 2015.
CTFR, dated Jan. 25, 2018, re: King, John B., U.S. Appl. No. 14/942,769, filed Nov. 16, 2015.
CTNF, dated Feb. 7, 2017, re: Daniel G. Moen, U.S. Appl. No. 14/980,231, filed Dec. 28, 2015.
CTFR, dated Jan. 10, 2018, re: Bei Zhang, U.S. Appl. No. 14/859,084, filed Sep. 18, 2015.
NOA, dated Jan. 25, 2018, re: Zhiwei Li, U.S. Appl. No. 14/718,736, filed May 21, 2015.
CTNF, dated Feb. 8, 2018, re: Xioming Zhou, U.S. Appl. No. 15/651,303, filed Jul. 17, 2017.
CTNF, dated Mar. 5, 2018, re: Justin D. Call, U.S. Appl. No. 15/785,309, filed Oct. 16, 2017.
Collection of articles regardimg HTML DOM, all available online as of Dec. 21, 2014, 7 pages, Dec. 21, 2014.
DuPaul, Neil, "Common Malware Types: Cybersecurity 101", Veracode, Oct. 12, 2012, 9 pages, Oct. 12, 2012.
Friendly Bit, "Rendering a web page—step by step,", published Jan. 11, 2010, pp. 1-2, Jan. 11, 2010.
"Custom Elements: defining new elements in HTML", Dec. 8, 2013, 15 pages, Dec. 8, 2013.
NOA, dated Mar. 14, 2018, re: Justin Call, U.S. Appl. No. 14/929,019, filed Oct. 30, 2015.
CTFR, dated Feb. 23, 2018, re: Wesley Hayes, U.S. Appl. No. 15/011,237, filed Jan. 29, 2016.
CTNF, dated Mar. 30, 2018, re: Michael J. Ficarra, U.S. Appl. No. 15/060,380, filed Mar. 3, 2016.
CTNF, dated May 3, 2018, re: Marc R. Hansen, U.S. Appl. No. 15/148,139, filed May 6, 2016.
CTNF, dated Apr. 19, 2018, re: Michael J. Ficarra, U.S. Appl. No. 15/919,034, filed Mar. 12, 2018.
CTFR, dated Apr. 9, 2018, re: Siying Yang, U.S. Appl. No. 15/242,062, filed Aug. 19, 2016.
NOA, dated Apr. 30, 2018, re: Xiaoming Zhou, U.S. Appl. No. 15/651,303, filed Jul. 17, 2017.
CTNF, dated May 15, 2018, re: Marc R. Hansen, U.S. Appl. No. 15/202,755, filed Jul. 6, 2016.
CTFR, dated May 10, 2018, re: Nwokedi Idika, U.S. Appl. No. 14/728,596, filed Jun. 2, 2015.
CTNF, dated Feb. 16, 2018, re: Siying Yang, U.S. Appl. No. 15/068,468, filed Mar. 11, 2016.
NOA, dated May 18, 2018, re: Siying Yang, U.S. Appl. No. 14/942,769, filed Nov. 16, 2015.
CTNF, dated May 23, 2018, re: Bei Zhang, U.S. Appl. No. 14/859,084, filed Sep. 18, 2015.

(56) References Cited

OTHER PUBLICATIONS

CTFR, dated May 17, 2018, re: Jarrod S. Overson, U.S. Appl. No. 15/059,080, filed Mar. 2, 2016.
NOA, dated May 14, 2018, re: Xiaoming Zhou, U.S. Appl. No. 15/651,303, filed Jul. 17, 2017.
CTNF, dated Jun. 7, 2018, re; Siying Yang, U.S. Appl. No. 14/925,547, filed Oct. 28, 2015.
CTFR, dated Jun. 6, 2018, re: Oscar H. Steele III, U.S. Appl. No. 15/224,985, filed Aug. 1, 2016.
CTNF, dated Feb. 1, 2018, re: Nwokedi Idika, U.S. Appl. No. 15/204,710, filed Jul. 7, 2016.
NOA, dated Aug. 13, 2018, re: Daniel G. Moen, U.S. Appl. No. 14/980,231, filed Dec. 28, 2015.
CTNF, dated Jul. 31, 2018, re: Wesley Hales, U.S. Appl. No. 15/11,237, filed Jan. 29, 2016.
NOA, dated Sep. 5, 2018, re: Daniel G. Moen, U.S. Appl. No. 14/980,231, filed Dec. 28, 2015.
CTNF, dated Sep. 10, 2018, re: Roger S. Hoover, U.S. Appl. No. 15/085,114, filed Nov. 6, 2017.
NOA, dated Sep. 17, 2018, re: Siying Yang, U.S. Appl. No. 14/942,769, filed Nov. 16, 2015.
NOA, dated Sep. 5, 2018, re: Michael J. Ficarra, U.S. Appl. No. 15/919,034, filed Mar. 12, 2018.
NOA, dated Jul. 5, 2018, re: Siying Yang, U.S. Appl. No. 15/068,468, filed Mar. 11, 2016.
NOA, dated Sep. 19, 2018, re: Nwokedi Idika, U.S. Appl. No. 15/204,710, filed Jul. 7, 2016.
CTNF, dated Sep. 19, 2018, re: Eli Mattson, U.S. Appl. No. 15/430,224, filed Feb. 10, 2017.
NOA, dated Sep. 13, 2018, re: Justin D. Call, U.S. Appl. No. 15/785,309, filed Oct. 16, 2017.

\* cited by examiner

BLIND HASH COMPRESSION

This application is a continuation of U.S. application Ser. No. 14/160,107 (now U.S. Pat. No. 9,225,729), filed Jan. 21, 2014, the entire contents of which are incorporated herein by reference.

TECHNICAL FIELD

This document generally relates to computer communications.

BACKGROUND

Web content, such as HTML or JavaScript for generating web pages, may contain application-like functionality that is interpreted and executed within a visitor's browser, or in a similar application. The general goal with HTML and other web technologies is to make them work, and work similarly, across many different platforms (e.g., Mac, PC, Linux, etc.).

To maximize the functionality of web content, it can be relevant for a system that serves the content to know the configurations of computers (whether desktop, smartphone, tablet, or other) that are being served the content. For example, particular knowledge can be obtained by identifying the type of browser that is rendering a web page, the operating system on which the browser is running, and plug ins that might also be operating on such computers. However, this additional supporting information must generally be sent from the various client computers to the server system, and such transmission adds overhead to the functioning of a browser presenting a web page or other application, which overhead is not directly responsible for improving operation of the page.

SUMMARY

This document describes systems and techniques by which various user computing devices (computers such as desktops, laptops, tablets, and smartphones) can submit information to a server system in a manner that lowers the bandwidth required for such reporting. Specifically, certain of the computing devices can send information in a lossy compressed format (e.g., as a hash of the original information), while others can send the same information in an uncompressing format (e.g., as the original plaintext). The compressed format may be highly compressed, such as by a lossy one-way function so that the server system cannot immediately determine what original string a compressed submission is indicative of (e.g., via a hash function or other lossy compression function).

To determine what the compressed submissions represent, the server system compresses any received uncompressed submissions (or submitted with lossless compression) using the same technique used by the client devices to perform their compression, at which point the server system knows the correlation between the uncompressed and compressed representations, and can then correlate any previously-or later-received compressed representations back to the original raw data. The percentage of the client computers reporting raw data may be much smaller than those reporting compressed data, so that the overall bandwidth of the system is substantially reduced. For example, each of the computing devices may determine whether it should submit a compressed representation of the data, or instead, an uncompressed representation by generating a random number (again, e.g., using standard JavaScript functions), and only send a particular format or representation if the generated number is above or below a predetermined number, as the case may be.

The server system may provide a biasing value to the computing devices when it serves web code so as to push the random number higher or lower, so as to affect the likelihood that any particular computing device will send uncompressed, raw data instead of compressed data. More frequent submission of uncompressed representations will allow a server system to more quickly identify the real meaning of data that newly arrives, e.g., when new features arrive on the computing devices (e.g., new plug ins are announced), but could cause higher bandwidth usage in a pool of computing devices. Thus, an operator of a server system may use the biasing value to match its desire for fast reaction versus its desire for lower bandwidth requirements.

To further minimize the amount of data transfer needed, the compression algorithm may be one that is available from public libraries, such as standard JavaScript hash algorithms. In this manner, the server system may automatically obtain plaintext representations of new data as it arrives in a pool of computers (e.g., all computers trying to access a particular retailer's web site), but may also determine how broadly such information has spread without having to send the potentially voluminous plaintext representation for very many of the computing devices.

Generally, hashing algorithms are selective enough that very few collisions will be seen between hashes (i.e., two different strings of text sent by computing devices will seldom generate the same hash value). When there are collisions, however, a server system will not be able to determine what is meant by such a compressed value when it arrives (it will be ambiguous as between the two or more source strings that generate the compressed value). Thus, the system just discussed may also include provisions for resolving such collisions. For example, a computing device may perform a secondary compression that uses a different algorithm than the primary compression, so that if the values of both compressions do not match across different submissions, then the source text for those different submissions is known to be different. Alternatively, or in addition, a length of the source string may also be submitted as to serve as yet another separate check on the source string.

In particular implementations of such techniques, the collected data may be configuration data for the computing devices, which may include, for example, the make and model of the computer, the make and version of the operating system and the web browser that is being used, the identity of active plug ins and other applications currently executing on the computing device in addition to the browser, among other things, such as installed fonts, screen resolution, etc. Collected data may also include activity data that identifies actions that have been taken on the computer, including actions by third-party software that appears to be anomalous (e.g., attempts to interact with the revised web code in an invalid manner). Such data may be collected by one or more central server systems for diagnostics purposes, including for identifying the state of machines when a program throws an error, and for identifying common characteristics of computing devices that are exhibiting fraudulent or other anomalous behavior. For example, a criminal group may have a plug in or other software surreptitiously distributed to thousands of computers spread across the world to form a so-called bot net, and the server system discussed here may use reporting information from such computers to more quickly and accurately identify the presence of a new bot net that is emerging, and the behavior of that bot net (e.g., if common reports of malicious activity are coming from a particular operating system running a particular browser version).

Various implementations are described herein using hardware, software, firmware, or a combination of such components. In some implementations, a computer-implemented method can include serving, from a computer server system and to a plurality of different computing devices remote from the computer server system, web code and code for reporting parameters of the computing devices; receiving from different ones of the computing devices, a plaintext representation of a particular parameter of a first of the computing devices, and a hashed representation of the same parameter of a second of the computing devices; hashing the plaintext representation of the particular parameter to create a hash value, and comparing the hash value to the hashed representation; and based on a determination that the hash value matches the hashed representation, correlating the hashed representation to the plaintext representation on the computer server system, wherein the code for reporting parameters of the computing devices includes code for allowing the computing devices to determine whether to send a plaintext representation or a hashed representation.

These and other implementations can optionally include one or more of the following features. The code for allowing the computing devices to determine whether to send a plaintext representation or a hashed representation can include biasing data that affects a frequency with which the computing devices select to send the plaintext representation or the hashed representation.

The method can further include receiving from the computing devices, plaintext representations and hashed representations of a plurality of different parameters of the computing devices; hashing the received plaintext representations to created hashed values; and using correlations between the hashed values and the received plaintext representations to identify parameters represented by the hashed representations. The method can further include using the hashed representation and the plaintext representation to identify characteristics of malware executing on the computing devices.

In some implementations, a computer-implemented method can include serving, from a computer server system and to a plurality of different computing devices remote from the computer server system, web code and code for reporting status of the computing devices; receiving from one or more of the computing devices, first data that indicates a parameter of the one or more computing devices, the first data in a compressed format; receiving from one or more others of the computing devices, second data that indicates the parameter of the one or more others of the computing devices, the second data in an uncompressed format; and compressing the second data and comparing the compressed second data to the first data to correlate the first data to the second data, wherein the code for reporting status of the computing devices includes code for allowing the computing devices to determine whether to send the first data or the second data.

These and other implementations can optionally include one or more of the following features. The code for allowing the computing devices to determine whether to send the first data or the second data can include biasing data that affects a frequency with which the computing devices select to send the first data or the second data. The first data can be compressed on the computing devices using hashing. The server system can be configured to not send hashing algorithm information to the computing devices. The method can further include using the compressed format to represent the parameter in identifying aggregate activity by multiple of the computing devices. The method can further include determining from the aggregate activity by multiple of the computer devices whether ones of the multiple computing devices is infected with malware. The computer server system can be an intermediary security server system that is separate from a web server system that generates and serves the web code. The method can further include comparing information sent with the compressed second data to information derived from the received first data to determine whether the compressed second data was generated from data that matches the first data.

In some implementations, one or more non-transitory storage devices can store instructions that, when executed by one or more computer processors, perform operations comprising: serving, from a computer server system and to a plurality of different computing devices remote from the computer server system, web code and code for reporting status of the computing devices; receiving from one or more of the computing devices, first data that indicates a parameter of the one or more computing devices, the first data in a compressed format; receiving from one or more others of the computing devices, second data that indicates the parameter of the one or more others of the computing devices, the second data in an uncompressed format; and compressing the second data and comparing the compressed second data to the first data to correlate the first data to the second data, wherein the code for reporting status of the computing devices includes code for allowing the computing devices to determine whether to send the first data or the second data.

These and other implementations can optionally include one or more of the following features. The code for allowing the computing devices to determine whether to send the first data or the second data can include biasing data that affects a frequency with which the computing devices select to send the first data or the second data. The first data can be compressed on the computing devices using hashing. The operations can further include using the compressed format to represent the parameter in identifying aggregate activity by multiple of the computing devices. The operations can further include determining from the aggregate activity by multiple of the computer devices whether ones of the multiple computing devices is infected with malware. The computer server system can include an intermediary security server system that is separate from a web server system that generates and serves the web code. The operations can further include comparing information sent with the compressed second data to information derived from the received first data to determine whether the compressed second data was generated from data that matches the first data.

In some implementations, a computer-implemented system includes: a first data communication interface arranged to communicate with a web server system; a second data communication interface arranged to communicate with clients that request content from the web server system; a compressed code interpreter programmed to identify an original form of compressed content received from particular ones of the clients by (a) compressing original content received from other ones of the clients to form a compressed representation, and (b) comparing the compressed representation to the compressed content received from the particular ones of the clients, wherein compressed code interpreter compresses the original content using a technique that matches techniques used by the particular ones of the clients to compress the content.

These and other implementations can optionally include one or more of the following features. The system can be further programmed to provide code to the clients that allows the clients to determine whether to provide compressed content or instead, uncompressed content to the system.

In some implementations, a computer-implemented method can include serving, from a computer server system and to a plurality of different computing devices remote from the computer server system, web code and code for reporting parameters of the computing devices; receiving from different ones of the computing devices, a plaintext representation of a particular parameter of a first of the computing devices, and a hashed representation of the same parameter of a second of the computing devices; hashing the plaintext representation of the particular parameter to create a hash value, and comparing the hash value to the hashed representation; and based on a determination that the hash value matches the hashed representation, correlating the hashed representation to the plaintext representation on the computer server system, wherein the code for reporting parameters of the computing devices includes code for allowing the computing devices to determine whether to send a plaintext representation or a hashed representation.

The features discussed here may, in certain implementations, provide one or more advantages. For example, a security intermediary system may be provided that does not add an appreciable level of bandwidth to the communication channel between a server system and the clients it services. The intermediary system may collect data that is relatively large compared to the bandwidth that it occupies, and may use that data for diagnosing problems with particular clients, and across large numbers of clients (e.g., by identifying the spread of malware threats). Moreover, a wide variety of data for various purposes may be transmitted using these techniques, and may be used for a wide variety of purposes once it is interpreted at the server system. Moreover, in certain implementations, the compressed representations can be used as database keys, thus further simplifying the operations recited herein.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
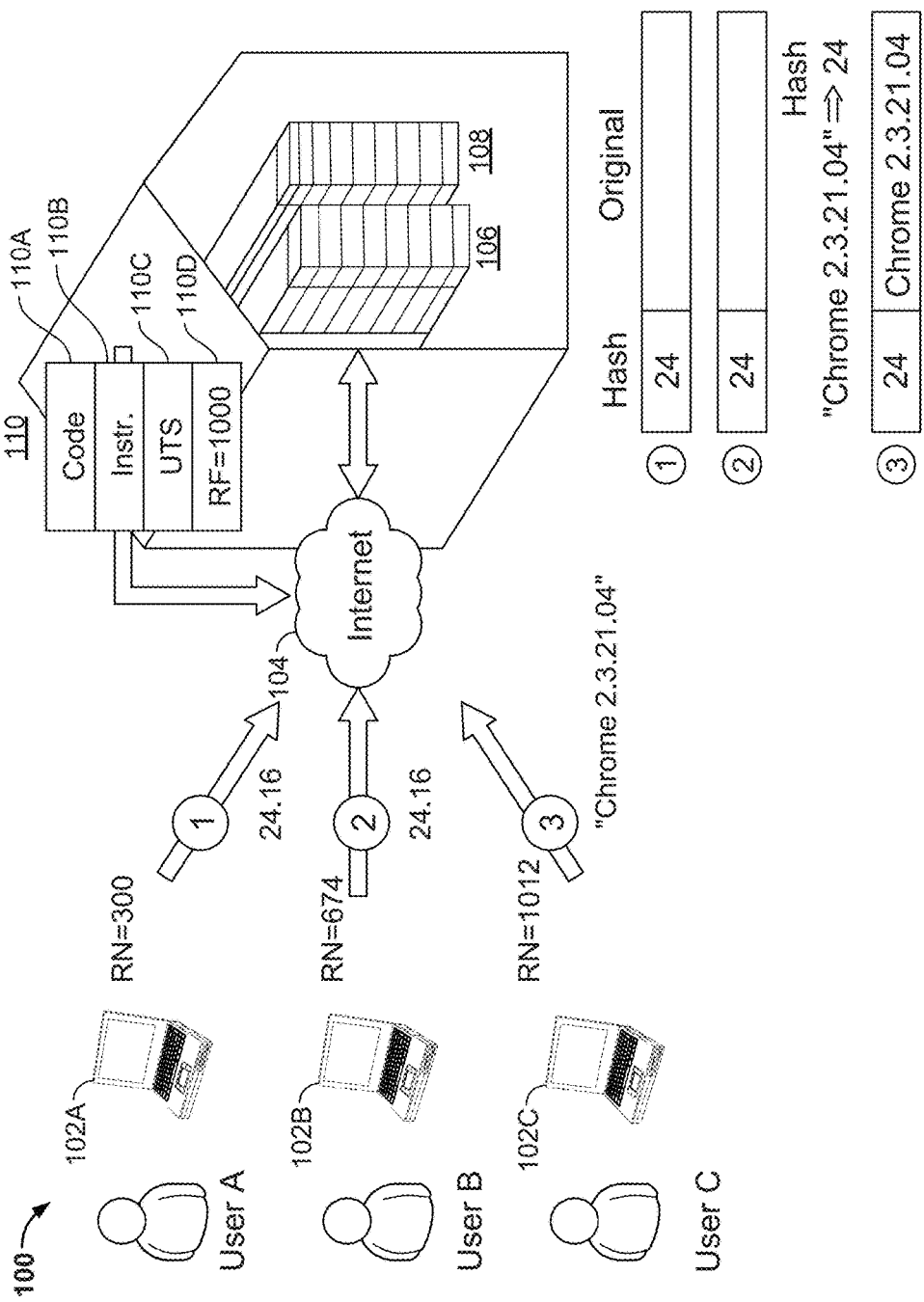
FIG. 1 is a schematic diagram of a system for providing compressed reporting of computing device information using a blind hash.

This document discusses mechanisms for reducing bandwidth between client computing devices and server systems with which they communicate (where "clients" and "servers" are terms used generally, and do not require any sort of formal client-server architecture). Generally, the mechanisms are most useful where many different computing devices will be communicating the same data to the server system. For example, it may be beneficial to have computing devices report their configuration information to a server system so that the system can identify commonality in the operations of such devices, for example, to diagnose reasons for faults in the devices or to identify the emergence of malware on the devices in a large group of devices (e.g., all devices that access a banking or retail web site).

The common data that is communicated may be communicated by some of the computing devices in its native form (e.g., plaintext) or another form in which its content can be directly determined (e.g., via lossless compression or encryption for which the server system receiving the data can accurately decompress or decrypt the data). Others of the devices may communicate the same data in a form from which it cannot be identified directly, such as by submitted a hash of the data. When the server system receives compressed representations of the text but has not yet received the original representation, it can save indications of the compressed representations in association with the computing devices from which they were received, without knowing the original representation. When the server system receives any uncompressed representations, it can compress them using the same algorithm that the client devices used, can store the correlation of the compressed representation to the original representation, and can use that correlation to resolve any compressed representations, whether associated with events reported from computing devices in the past or the future, to determine what the compressed representation actually represents.

Some or all compressed representations may be accompanied by a secondary representation, that can be used to identify potential collisions between the compressed representation. In particular, because the compressed representations are smaller in size than the uncompressed representations, certain compressed representations will end up being repeated in a system—so that two identical compressed representations received by a server system could represent different original strings. Though proper selection of parameters will make such collisions relatively rare, where the volume of the different strings that need to be represented is extensive, the risk of a collision may be relevant. The secondary representation, then, may serve as a check on the main representation, as it will be extremely unlike that both would match even though the original text did not. Such secondary representation may be transmitted to the server system with the compressed representation, and may be formed, for example, by applying a second hash or other compression technique to the original text that uses a different algorithm, or by sending a value that represents a length of the original string.

The compressed representations or other representations that correspond to the compressed representations may then be passed as identifiers for the original data to systems that can perform analysis using such data. For example, client devices may pass reports that indicate anomalous activity, such as efforts by a browser plug-in to access served code using defunct function names or the like (e.g., in a system that uses a security intermediary to change the function names with each serving of the web code). A fraud detection system may perform clustering analysis on the reported features of such computing devices, and may use the compressed representations as identifiers for the various reported features in performing such analysis. The analysis may be used to identify that device having particular characteristics (e.g., IP address, operating system, and browser) that have reported the existence of anomalous behavior, which may in turn be used to determine whether the anomalous behavior is benign (e.g., from a plug in that users intentionally installed) or malicious (e.g., code performing a "Man in the Middle" attack on their devices).

FIG. 1 is a schematic diagram of a system 100 for providing compressed reporting of computing device information using a blind hash. In general, the system 100 is directed to presenting information from a web server system 108 to a variety of computing devices 114A-C that are located remotely from the web server system 108. Examples of operators of such a web server system 108 include on-line retailers and on-line banking systems, where the devices 114A-C belong to people trying to buy products or perform on-line banking transactions. The web server system 108 is shown as a row of servers along with a separate row of servers for a security server system 106, both in a single data center facility. Such arrangement is intended to indicate that, in one typical implementation, an operator of a web site may supplement its main server system 108 with a security server system 106 that it builds itself or that it acquires for a third party. The security server system 106 may physically and logically between the web server system 108 and the network, which may include internet 104, and may intercept web code to be served to the various client devices 102A-C.

In the described example, the system 100 operates by providing modified or recoded web code to the client computing device 102, where the modifications are relative to a web page that would normally be served to the client computing device without additional security measures applied. Web code may include, for example, HTML, CSS, JavaScript, and other program code associated with the content or transmission of web resources such as a web page that may be presented at a client computing device 102 (e.g., via a web browser or a native application (non-browser)). The system 100 can detect and obstruct attempts by fraudsters and computer hackers to learn the structure of a website (e.g., the operational design of the pages for a site) and exploit security vulnerabilities in the client device 102. For example, malware may infect the client device 102 and gather sensitive information about a user of the device, or deceive a user into engaging in compromising activity such as divulging confidential information. Man-in-the-middle exploits are performed by one type of malware that is difficult to detect on a client device 102, but can use security vulnerabilities at the client device 102 to engage in such malicious activity.

Served code 110 shows an example of code that can be served to a requesting one of various of the computing devices 102A-C after the request is provided to the web server system 108, the content from the web server system 108 is intercepted or otherwise provided to the security server system 106, and the code is changed and/or supplemented by the security server system 106. Various portions of the served code 110 are shown schematically to actions that the security server system 106 can take with respect to the code.

Code 110A represents the original web code provided by the web server system 108 with certain modifications made to it. For example, the security server system 106 may change the names of functions in essentially random ways every time a set of content for a web page is served, where the changes are made consistently across the served code so as not to break internal references between pieces of the code. For example, references to a particular function may be made consistently across HTML, CSS, and JavaScript. For example, the following strings indicate HTML before and after alteration using a random number for textual replacement:
Original code:
<form        action="login.jsp"        method="post" name="Login">
  <input       type="text"       id="lastname_id" name="lastname"
Re-coded format:
<form        action="login.jsp"        method="post" name="imp0q6wNm">
  <input       typ="text"       id="b24mpqdfKX" name="aSkFjp5x1Y"

Such changes may be made so that malware on a client device that receives the code cannot easily identify the operational structure of the web site and/or automatically interact with the code so as to mislead a user into opening its security to the malware (e.g., for a Man in the Middle attack). By making the changes frequently enough and randomly enough that automated malware cannot interact with it predictably, the security server system 106 interferes with such attacks by malware.

Instrumentation code 110B is added to the code 110A by the security server system 106, and allows the system 100 to detect malware in addition to deflecting its efforts. In particular, the instrumentation code 110B can execute in the background on the computing devices 102A-C and can monitor how the code 110A operates and how other code on the particular computing device 102A-C interacts with the execution of code 110A. For example, the instrumentation code 110B can monitor the DOM made from the code 110A at different points in time and may report back to security server system 106 information that characterizes the current state of the DOM. Such information can be compared to information that indicates what the DOM should look like in order to determine whether other side is interfering with the execution of code 110A. Alternatively, or in addition, the instrumentation code can identify anomalous attempts by third-party code to interact with the operation of code 110A, such as for calls made to code 110A using "old" names for the code (e.g., names that were valid in a prior serving of the relevant web page but that are no longer relevant because security server system 106 is constantly changing the names so as to create a moving target for such third-party code to hit).

A user telemetry script 110C is also provided to a requesting one of computing devices 102A-C. The user telemetry script 100C may include code for managing communications between the relevant client device and the security server system 106. Such communications may include transmission of information identified by the instrumentation code 100B described above, and other relevant information. In certain implementations, the security server system 106 can be supplied additional information using the user telemetry script and after the code 110A has been served, such as information that affects the manner in which the instrumentation code 110B operates. For example, the security server system 106 may receive a report from the user telemetry script 110C that indicates that a third-party program is attempting to interact with the served code 110A, and may respond so as to have the instrumentation code 110B perform certain operations to better understand the nature of the interaction occurring on the computing device.

A request frequency code 110D may also be sent and may be as simple as a single number that biases the user telemetry script 110C to return information to the security server system 106 in its original form, or instead in a compressed form. For example, the request frequency code 110D that is sent in this example is a value of 1000, which may have been selected by the security server system 106 for a range between 0 and 1024 in this example. In turn, the user telemetry script 110C may be programmed to select a random number between 0 and 1024, and to return the original text rather than a compressed version of the original text when the randomly-selected number exceeds 1000. As a result, original text will be returned by only about 2% of all computing devices that are served code from the security server system 106 using this request frequency value. Others of the computing devices will return a compressed version of the text, such as a hash of the original text produced by the particular device.

Upon receiving the code 110, the particular client devices 102A-C may render respective webpages and establish document object models that represent the served page, in a familiar manner. User interactions with the webpage and associated code may then begin. At or around that time, the instrumentation code 110G and user telemetry script 110C may execute to return information about the configuration of a particular computing device to the security server system 106. For example, the user telemetry skip script 110C may return data that identifies the operating system of the particular computing device, the model of the particular computing device, the amount of RAM loaded on the computing device, other applications executing on the computing device, and similar information. In certain implementations, such functionality may be provided using a browser plug in that is programmed to perform a check of the environment for the machine on which it is running. Generally, JavaScript or VBScript can permit that measurement of User Agent, other HTTP header information, indirect measurements of the JavaScript execution environment, Plugin information, fonts, and screen information.

As shown by the arrow labeled with a 1 in a circle, computing device 102A returns the numeric pair 24.16. These numbers represent, respectively, a hash of a textual string that represents the name and model of the browser that is running on computing device 102A. In the example here, all three computing devices 102A-C are running the "Chrome 2.3.21.04" browser release, as an example. Such information may be obtained by making a request that is to be responded to with the "user agent" string on the particular computing device, in a familiar manner. In the current example, computing device 102A delivered this compressed representation of the user agent string, because it generated a random number of 300, which is less than the request frequency number of 1000.

Similarly, when computing device 102B received the served code 110, it generated a random number of 674, meaning that it too would send a compressed version of the user agent string, or 24.16. In both these examples, 24 has been selected as an example to represent a hash that may be created from such a string, and the number 16 represents the number of characters in that string.

The actual string itself can be seen as being transmitted from computing device 102C back to security server system 106. Here, computing device 102C selected a random number of one 1012, which is greater than the request frequency number of 1000. As a result, computing device 102C will be one of the 2% of all devices that report back the original, uncompressed (unhashed) version of the user agent string.

To better show the level to which an initial string can be compressed, the user agent string for Firefox on an Ipad is "Mozilla/5.0 (iPad; U; CPU OS 3_2_1 like Mac OS X; en-us) AppleWebKit/531.21.10 (KHTML, like Gecko) Mobile/76405." A compressed representation that indicates a hash and a length might be of the form 4528.111. As can be appreciated, the bandwidth for the latter is much lower than for the former.

In the figure, operations of the security server system 106 performed in response to receiving the communications from devices 102A-C are shown schematically as a two-column database entry below security server system 106 and Web server system 108. The two columns are shown to indicate how a system may associate a compressed version of a string with the actual string itself. In a first representation shown by a 1 in a circle and corresponding to actions that would occur in response to the first transmission from computing device 102A, the database has been populated with the hash value of 24 upon receiving that hash value form device 102A. The system 100 does not, at that point, know what the original string representation for that value is (assume that the system did not receive earlier communications regarding the user agent string from other device), but stores the hash value 24 in anticipation that will eventually be able to determine what the original, plaintext value is.

In a second representation shown by the number 2 in a circle and representing the transmission from computing device 102B, the table has not changed because again, the security server system 106 received only the hash code, and not the original version of the user agent string. Finally, at the bottom of the representation, the system receives a string of original plaintext and, as shown by the arrow labeled with "hash," the system performs a hashing function on that plaintext that is the same as a hashing function that the system 100 knew to be provided by the computing devices 102A-C. For example, each of the computing devices 102A-C and the security server system 106 may be programmed to use the same hashing algorithm as the Java hash algorithm, which is well known and readily available on many computing platforms.

With that hash value (24) in hand, the security server system 106 may search the table for a matching value, and when it finds such a matching value, it may determine that that matching hash value is what corresponds to the original text. It may then update the table to correlate the particular hash value with the particular original plaintext. Such a correlation is shown in the row of the table labeled with a 3 in a circle.

This correlation may then be used with other parts of the system. For example, the number 24 can be used throughout the system to represent the user agent string represented here (i.e., as a unique database index value). As some examples, a cluster analysis system like that discussed with respect to FIG. 2 below may use the number 24 to represent such a feature instead of using the full string representation. In other embodiments, yet a third representation for the feature may be used as an index representation.

The processing of the communication from computing device 102C may also be accompanied by a determination that the full string is 16 characters in length. Such a value may be stored in yet a third column of the table (not shown) and may be correlated to the hash value and the original plaintext of the string. When later communications arrive with a hash value of 24, they may be compared to the first column shown in the table, and their accompanying value of 16 may be compared to this additional value to provide more confidence that the hash value is unique to this particular original textual string. As discussed above, other techniques may also be used to ensure that there are no collisions in the hash values, such as by returning an additional number or other representation that is generated by an alternative hash algorithm. In certain implementations, if the security server system 106 identified that there may be a problem with a received hash value, the security server system 106 may provide a special message to the responding computing device to trigger the responding computer device to transmit the original plaintext code instead of the hash value.

Other tables may store additional relationships that are of value in operating the system 100. For example, one table may store identifiers for particular ones of the computing devices 102A-C, where a particular device may be identified by a cookie that it stores and passes to the security server system 106. That device identifier may then be related to the variety of parameters, such as the user agent parameter just discussed, and additional parameters, which may include hardware identifiers, operating system identifiers, and software identifiers, among other things. By this mechanism then, the system 100 may correlate a particular device to particular configuration information and to configuration parameters reported by the device.

This particular example is highly simplified for purposes of clarity. In a typical implementation, many different webpages and other Web resources will be served by system 100 to many different computing devices. Thus, a large number of different hash values will be received by security server system 106 in an interleaved fashion with each other, and the system will need to correlate those hash values or other compressed values with particular original text represented by those values. Such multi-value implementation may occur, for example, by adding additional records to the simple table shown here, or by other appropriate techniques.

A server system can also specify a seed to be used before generating a random number, or specify another random number generation method (and the initial state of the pseudorandom number generator (PRNG), and the choice threshold value, such that the sequence of fields chosen will be known by the server. This can be used to force the client to generate an "uncompressed" value for a field that is unknown by the client. It can also be used to allow the server to have more control over the data flow (more or less data), and can even be used as a mechanism for determining when a malicious client is sending data in a non-compliant format, which could be used to determine that the client is, in fact, addled with malware.

From time to time, hash values that have already been correlated with original text may also be tested by other incoming original text. For example, the security server system 106 might not normally perform a hash on incoming original text if the system 106 has determined that there is already a correlation for that text in the table. However, a random number approach similar to that used on the computing devices 102A-C may be used so that the security server system 106 periodically does perform such a hashing and comparison so as to confirm the accuracy of the data in the table. If the system 106 determines that there is an inaccuracy, because the hash value generated for an incoming string of text does not match a pre-existing hash value in the system for that text, the system 106 may generate an exception and alert an operator of the system 106.

Also, the example here is stated in terms of Web code being served to a general web browser. Other types of code may alternatively be served to other types of applications. In such situations, those other applications may be caused to choose whether to return original or compressed configuration information, or such decisions may be made by code separate from the applications but made in respect to the execution of the applications.

Also, although the techniques discussed here have been associated with communications for the delivery of information related to browser environment and user or automated interactions with web pages, they may also, in appropriate circumstances, be applied more generally. For example, other data that is reported at periodic intervals and is common as between a substantial portion of those reporting events, may be compressed using the techniques here, and interpreted using uncompressed (or losslessly compressed) messages in some instances of the reporting, and lossy compressed messages corresponding to the same content in other instance of reporting. Various mechanisms, including those discussed above and below, may be used to identify that the compressed and uncompressed messages match each other in their content, and to then associate the compressed messages with the uncompressed content.

In addition, while the techniques are described here as involving transmission of data to a server system from web code served to a browser, other techniques may also be used. For example, a stand-alone application for a particular organization may report information to a server system, and may be programmed to use the sometimes-compressed/ sometimes-uncompressed techniques described here to transmit necessary data to the server system (particularly when the data is largely repetitive as between different reporting events for the data).

Figure 2:
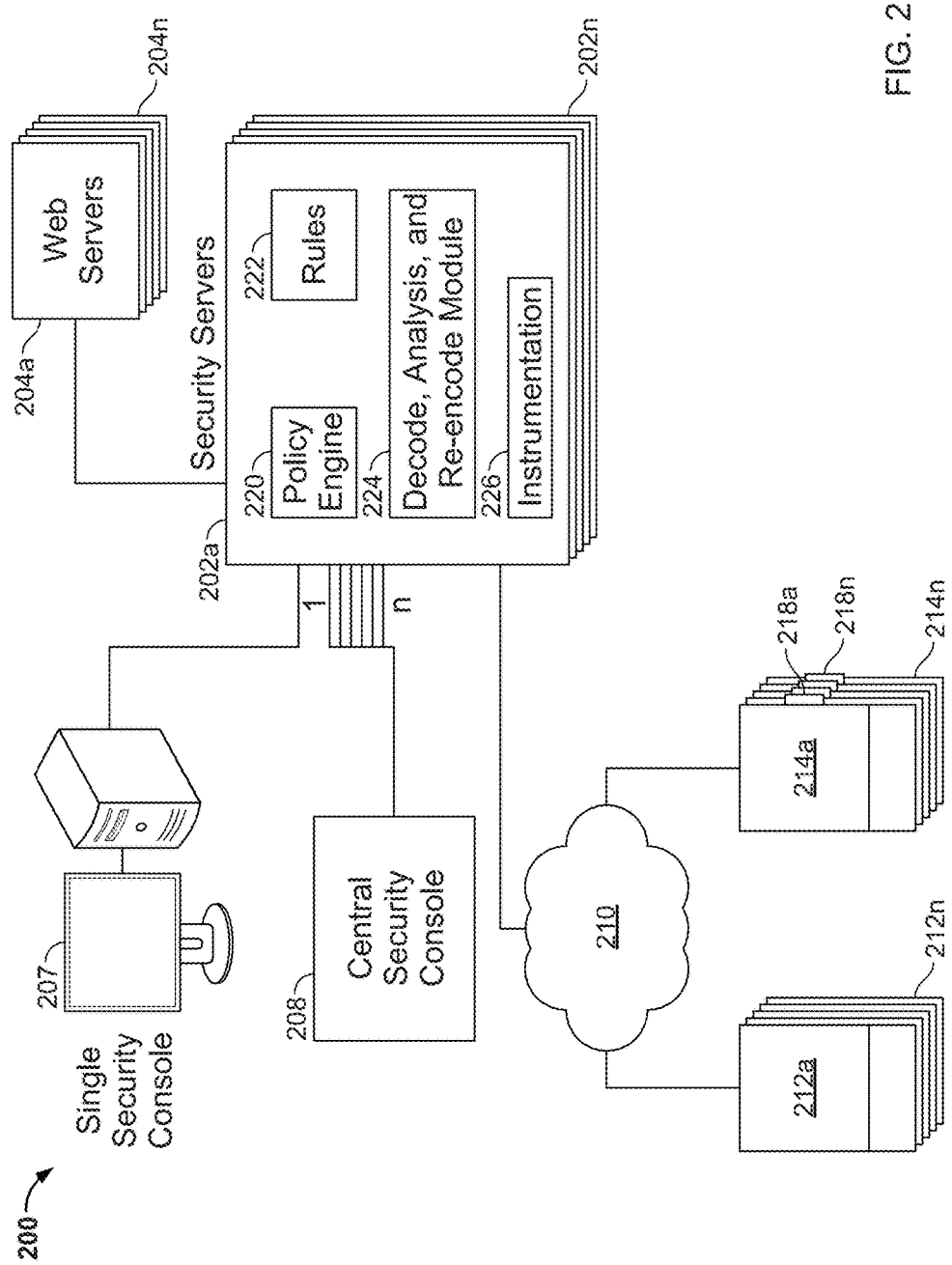
FIG. 2 is a schematic diagram of a system for performing deflection and detection of malicious activity with respect to a web server system.

FIG. 2 is a schematic diagram of a system 200 for performing deflection and detection of malicious activity with respect to a web server system. The system 200 may be the same as the system 100 discussed with respect to FIG. 1, and is shown in this example to better explain the interrelationship of various general features of the overall system 200, including the use of the reporting of compressed and uncompressed versions of the same strings in order to conserve bandwidth (for compressed representations) and to determine what the compressed representations represent (for uncompressed representations).

The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the internet. Although both extend to n in number, the actual number of sub-systems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine 220 may be programmed to classify requests and correlate them to particular actions to be taken to code returned by the web server systems (for transmission to requesting clients) before such code is served back to a client computer. When such code returns, the policy information may be provided to a decode, analysis, and re-encode module 224, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie that is saved at the relevant client computer. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

The instrumentation module 226 or another component may also provide a user telemetry script or other code for causing the client device receiving the other code to communicate with the server system after the code is transmitted. Such additional code may include code that causes the client devices to return configuration information about themselves, and to control whether they return the information in a compressed or native state, in the manners described above. The module 226 may also generate and provide to the client devices a request frequency value that helps control how often the native text is transmitted back to the system instead of the compressed form of the text. One or more modules may also control the receipt of such configuration information, the storage of the information, and the correlation of the compressed data (e.g., being used as an index value for a table) and the corresponding original form of the data.

As noted, the content from web servers 204a-204n, as encoded by decode, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware, or malicious code (218*a*-218*n*, respectively), programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212, 214. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

A central security console 208 may connect to a large number of web content providers, and may be run, for example, by an organization that provides the software for operating the security server systems 202*a*-202*n*. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like. The telemetry data may also include the received data that characterizes the then-current conditions of each of the client devices, such as the browser and operating systems that they were running, and other appropriate information.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3:
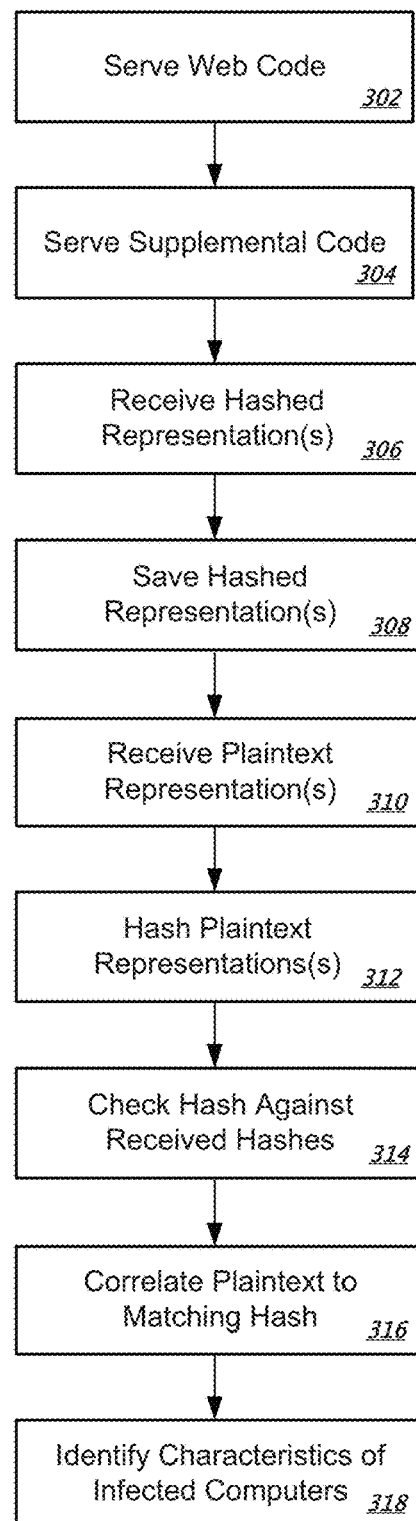
FIG. 3 is a flow chart of a process for reducing bandwidth requirements between computers.

FIG. 3 is a flow chart of a process for reducing bandwidth requirements between computers. In general, the process involves providing client computers with code that causes the computers to report back aspects of their operation. Different ones of the client computers are caused to report the information in compressed form, while others of the client devices are caused to report the same information in an original uncompressed, or plaintext form. The process can then use the combination of compressed and uncompressed reported information to correlate the compressed representations with the uncompressed representations, even though no particular computer or transmission provided such a correlation for the server system that served the code. The server system may make the correlation, for example, by performing a compression of received uncompressed code in a manner that matches the way that one or more of the client devices performed the compression of the same code or data.

The process begins at box 302, where the server system serves Web code to a plurality of different client devices. The Web code may be code for a particular webpage, for multiple related webpages, or for various unrelated webpages associated with different websites, including websites from different domains. In certain implementations, the Web code may be recoded from what is initially served by a Web servers, such as by rewriting the names of particular functions or other elements in unpredictable manners but in a way that is consistent across all of the elements being served (e.g., so that the code does not break when executed and so that calls made to a particular function or other element are changed according to the changes made in the name of the element).

At box 304, supplemental code is served by the system. The supplemental code may be served along with the Web code in a single transaction, or may be served separately. The supplemental code may include, for example, instrumentation code and telemetry code that causes the receiving client device to monitor the operation of the Web code that is served to the device and potentially to report back on such operation to a security server system, if the monitoring determines that anomalous activity is occurring on the client device. Other code may also be served, such as parameter values that may affect the way in which the supplemental code operates, such as a request frequency number described above, and other appropriate values.

At box 306, the server system may have waited after serving both the Web code and the supplemental code, and may subsequently receive, from the client or clients to whom the code was served, hashed representations for configuration. Those representations may represent a variety of parameters that are relevant to the client devices from which they come, including identifiers for the current configuration state of a particular client device. The particular parameter may be identified, and the value of the identified may be identified by the hash code that one of the client devices generated by hashing the plaintext parameter value. A number of different parameters may be reported on for each client device, and even more parameters may be reported on across a universe of client devices. For example, Web code served from a certain webpage may be accompanied by instrumentation code that reports back on certain parameters of a device, while Web code served for another webpage may be accompanied by code that reports back on other parameters.

When the system receives such hashed representations, it may save them, as shown at box 308, even though it does not at that time know what original values they represent. Such representations may also be associated with identifiers for client devices from which they were received, so that the particular configuration information for those devices may be determined later, even if it cannot be determined when the hashed representations are initially received.

At box 310, plaintext representations are received from one or more client devices. The plaintext representations may have been transmitted by those client devices in response to the client devices executing instrumentation or telemetry code that instructed the transmission of such plaintext versions of the information to be transmitted (e.g., upon the client device choosing to transmit plaintext rather than a compressed representation). When the security system receives plaintext representations from telemetry code, it may be programmed to first compress those plaintext representations such as by hashing them. The compression may occur according to a mechanism that matches a known hashing mechanism to be operating on the client devices in cooperation with the instrumentation and telemetry code that was served to those client devices.

With the plaintext representations having been hashed, the security system will now have a correlation between a particular plaintext representation and a particular hash value. The system may then compare that hash value to any of the hashed values that have previously been received, at box 314, and may then correlate whatever previously-received hash values were received to the plaintext representation that was later received, at box 316. In certain examples, the initial transfer of a particular piece of data may be in plaintext form, so that the database would be populated with a plaintext representation and a hash representation simultaneously. Later transmissions of plaintext representations may simply be matched against the plaintext column of the database, and the devices that sent those plaintext representations may be correlated with the hashed value as an index value for those devices. Alternatively, the plaintext values that are later received may always be hashed, and the hashed values may be compared against the database if that is a more efficient operation of the system computationally. Also, periodically, plaintext representations and their hash values may be checked against the table to ensure that there are no errors in the data. In addition, other values that represent the plaintext may be transmitted along with the hashed representations of the plaintext so as to ensure that the system is not receiving overlapping hash values that match each other but that each represent different plaintext representations.

At box 318, characteristics of infected computers are identified using information gleaned from the previous steps. For example, the hashed values may be used as data in statistical analysis techniques, such as techniques that may attempt to identify clusters of activity within a population of computers, such as a population of hundreds of thousands of computers. Clustering may indicate anomalous activities by those computers, and the hash values may then be used to determine what configuration information is possessed in common by computers within that cluster. As one example, the analysis may determine that a large majority of computers having anomalous behavior are running a recently released operating system or browser version (i.e., that anomalous behavior is clustered around a dimension associated with that particular value of the user agent parameter for a population of machines). Such a determination may be evidence of a vulnerability of such browser or operating system version to Mal Ware. An operator of the system described here may then act upon such information, such as to cause the browser or operating system to be updated or the security hole to otherwise be plugged.

Figure 4:
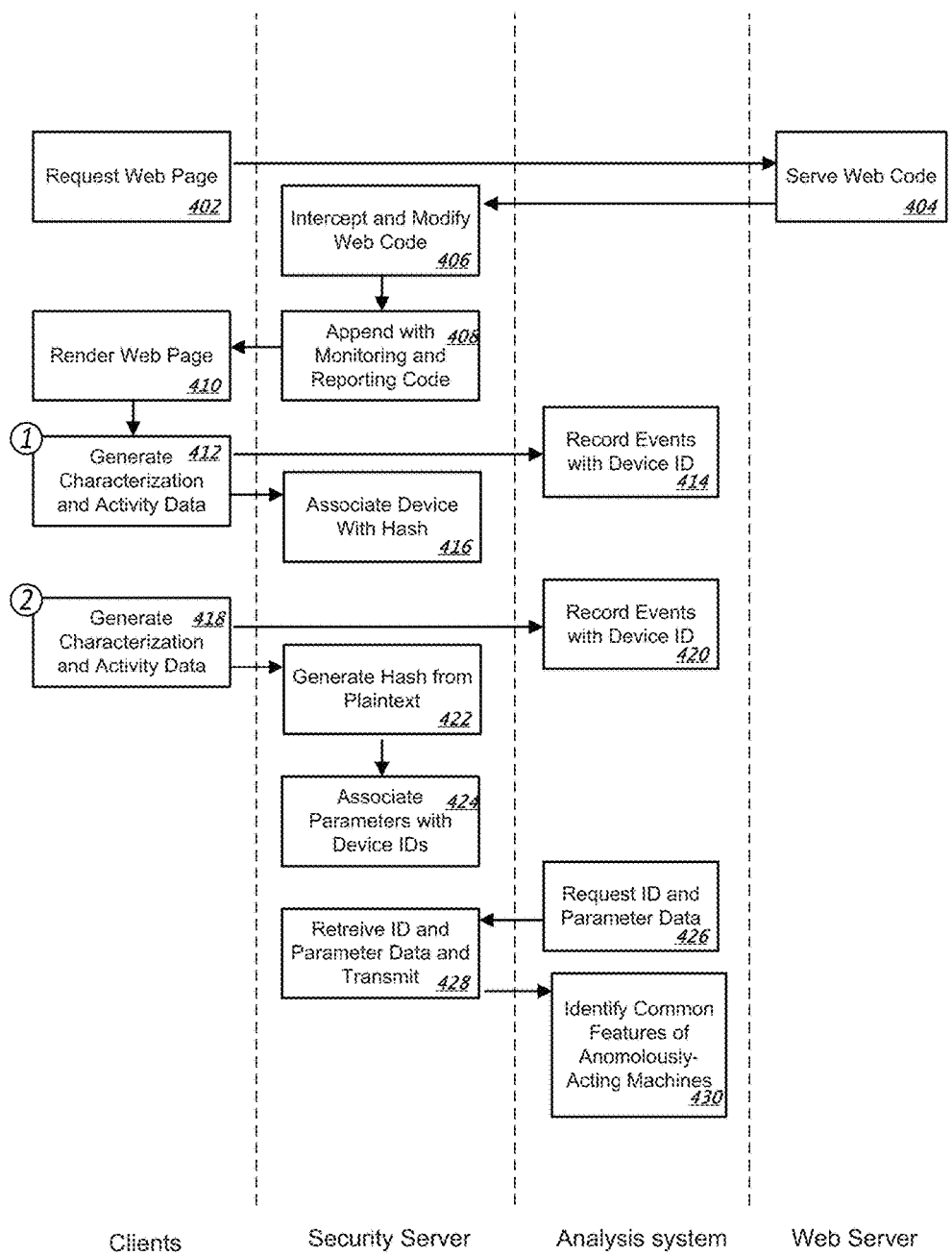
FIG. 4 is a swim lane diagram of a process for transferring data between client computers and a server system.

FIG. 4 is a swim lane diagram of a process for transferring data between client computers and a server system. In general, the process, like those discussed above, involves transmitting content to a server system, in most instances, in a compressed manner from which the identity of the original content cannot be determined (a lossy compression like forming a hash). In a small number of cases, the content can be transmitted in an uncompressed or losslessly compressed form, the received data may be compressed using a process equivalent to the process that was used by clients on the other received content, and the compressed form may be matched to the compressed forms received in that other received content. In this way, the original form of the other received content (both past and future) can be inferred.

The process begins at box 402, where a client device requests a web page, such as via a GET or POST method. Such a request may be directed to a particular URL served by a web server system of a particular organization. The request may result in the web server system identifying appropriate code to respond to the request, which may include static code and dynamic code, and may take the form of HTML, CSS, and JavaScript, among others. At box 404, the web server system serves the responsive code.

The served code is intercepted at box 406 by a security server system that, e.g., the operator of the web server system has added as an intermediary for providing security for the web server system. For example, a third party may provide a security system that can be added modularly to a company's web server system without having to affect the web server system in any substantial manner. In other implementations, the intermediary functionality may be integrated in the web server system. Also, the intermediary server system may be physically location within the same building as the web server system (for minimizing latency and maximizing the ability to coordinate systems) or in a separate location that requires communication through a network, including the Internet, At box 406, the security server system intercepts the code and modifies it. For example, as described above, the names of certain functions may be changed in a sufficiently random or arbitrary manner that the new names cannot be anticipated by malware running on the clients. The changes may be coordinated across different types of code (e.g., HTML, CSS, and JavaScript) where the names occur, so that the code functions the same as the code it replaced. Generally, the changes are made to latent code whose operation a user does not see, and static code.

At box 408, the code is appended with monitoring and reporting code. Such code may monitor the DOM that is created on the client when the served code is rendered, or may monitor attempts to interact with the code, and may characterize and report any abnormal activity. Such code may also report other status information about a client, such as configuration information that describes the features of the client system. In certain situations, a complete picture of what is occurring in the browser or other application (e.g., a specific app programmed for the company that serves the code). The reporting code may in particular include code for making a determination whether to report particular information in a compressed versus an uncompressed form, and then to transmit the data back to the server system accordingly.

At box 410, the client renders the web page by executing the various types of served code, and perhaps by acquiring code form other sources in addition to the code that was initially served by the web server system (whether from the organization that operates the web server system or from one or more other organizations). As described throughout this process, the serving and executing of code described here would be repeated across thousands or more different client devices that may each vary in different ways, such as by having different base (the basic computer) and extended hardware (e.g., added graphics cards or RAM), operating systems, installed and executing applications, and executing browser plug ins. Thus, each rendering of the web page may be performed in a different manner for different ones of the client devices, and even for the same client device in different sessions.

At box 412, the client device generates characterization and activity data that is to be sent back to the server systems. The box is labeled with a "1" to indicate that this step represents a subset of the devices that are served the web code, and are the devices that hash the data that is to be reported so as to lower the bandwidth required for such reporting. Generally, the vast majority of instances would be established to report in such a manner so as to significantly reduce the overhead of transmitting the data.

In this example, characterization data represents status of the client device, such as hardware and software on the device, whereas activity data represents actions that have occurred on the device, particularly since the device received the served web code (e.g., activities between the served code and other code that is on the device). The characterization data may be sent to one server system, while the activity data may be sent to another, or they may be sent to the same server system. Also, certain data may be sent according to the compressed/uncompressed scheme described in this document when the data is expected to be common across many devices, so that the original value of the content for devices that compress their content can be inferred from the uncompressed content (where, unless otherwise noted, uncompressed content includes content whose original form can be determined by a server system that receives it, and thus includes losslessly compressed content). Other data may be sent in a normal manner, without the pairing of compressed/uncompressed transmission, such as where the content is not typically common as among different machines, so that there would be relatively little value in trying to infer the original content from transmissions made by other machines.

At box 414, an analysis system receives the reported data, which may include activity data. The analysis system may use such activity data to identify that certain normal or anomalous activities have occurred on a certain device, and may conduct analysis on similar activity data received from a large number of other devices to identify clusters of common activity so as to determine that malware is taking advantage of such devices. The analysis system may also be provided with characterization data so that it can determine characteristics of the devices that are being affected by the malware.

Separately, or as part of the same communication, the client device may provide similar data to the security server system, as indicated at box 416. The security server system may then associate the particular client device with the hashed forms of the compressed content that is sent (as the analysis system may do if it receives only hashed data). At this point in the example process, the security server system has received no unhashed form of the content, so it does not know what the original form of the content was. As a result, the system may simply associate an identifier for the particular device with the hashed form of the received content (or may simply index upward a count of the number of clients reporting the content of the particular form of hash). In this example, multiple different fields may be reported in a hashed manner, such as one or more fields that identify hardware for a device, and one or more fields that identify software executing on the device. Each feature of the device (e.g., make and model, operating system, amount of RAM, etc.) may receive its own hash, or groups of features may receive a single hash—where each hash is selected so as to cover content that is likely to be common across many devices, so that the hash value may be readily reverse-engineered when an uncompressed version of the content is received from another device.

At box 418, another client (indicated by the circled "2") also generates and reports characterization and activity data. In this instance, the particular device does not compress the content that it reports—e.g., because it selected a number pseudo-randomly that does not exceed a predetermined level that was provided with the web page code. The analysis system may receive at least some of the generated content at box 420 (which may be the same content as received at box 414 or may contain some fields whose parameters are the same as those received at box 414), though here the content would be received in uncompressed form (e.g., either as plaintext or in a losslessly compressed format). To the extent the analysis system previously received parameters for certain fields in compressed format, it may compress the received uncompressed content to form a hash value and may then compare it to compressed content that was previously received. If the hash value matches a hash value stored form Box 414, then the original content may be associated by the system with the other devices that previously reported the hashed value, as may future devices that report the hashed value. Alternatively, or in addition, the analysis system can add to a number of devices that have reported as having the particular parameter.

Similarly, the second client device can report the characterization and activity data to the security server system, and at box 422, that system can generate a hash value for it. As with the analysis system, certain other fields may have been reported in hashed form or may always be reported by all devices in uncompressed form. At box 424, the security server system associates the particular parameters received from box 412 with the other instances of reporting the same content (as determined by comparing the just-generated hash value with previously-received hash values form the other devices).

In situations where the analysis system does not separately track associations between particular device IDs and content reported by those devices, the analysis system can request ID and parameter data (box 426) from the security server system. The security server system (box 428) may gather and transmit such data, and the analysis system may identify common features of anomalously-acting machines (box 430) using such data. In other words, in one implementation, the analysis system may receive activity data and use such data to identify clusters of common activity, or otherwise identify potential problems that arise in the operation of a number of different client devices. At the time of such initial analysis, the analysis system may not know the characterization data for the devices, and may only seek such data from the security server system after identifying the problem. Such follow-up information gathering may then be used by the analysis system to identify features of the devices that are determined to be acting anomalously, such as by determining that they all are executing the same browser program, and perhaps a common version or range of versions of that program. In yet other embodiments, the analysis system may repeat operations that are performed by the security server system, such as in the inferring of the original content of compressed messages via compressing of received uncompressed messages.

Also, the security server system and the analysis server system may be part of the same system or separate systems. For example, a retailer may manage both systems along with a web server system. In another example, a third-party may operate the analysis server system from its own facility, and can assist customers with operating their particular security server systems on their premises, with their web server systems. The third-party may aggregate activity over a large number of served content in such manner, and may more readily identify anomalous behavior than could a single organization serving only a fraction of such content.

Figure 5B:
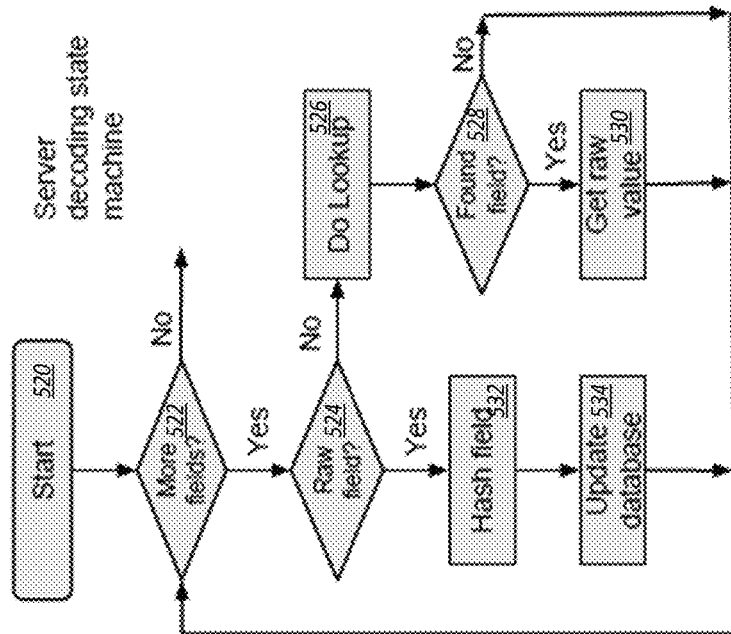
FIG. 5B is a representation of a state machine for server-side decoding.
Figure 5A:
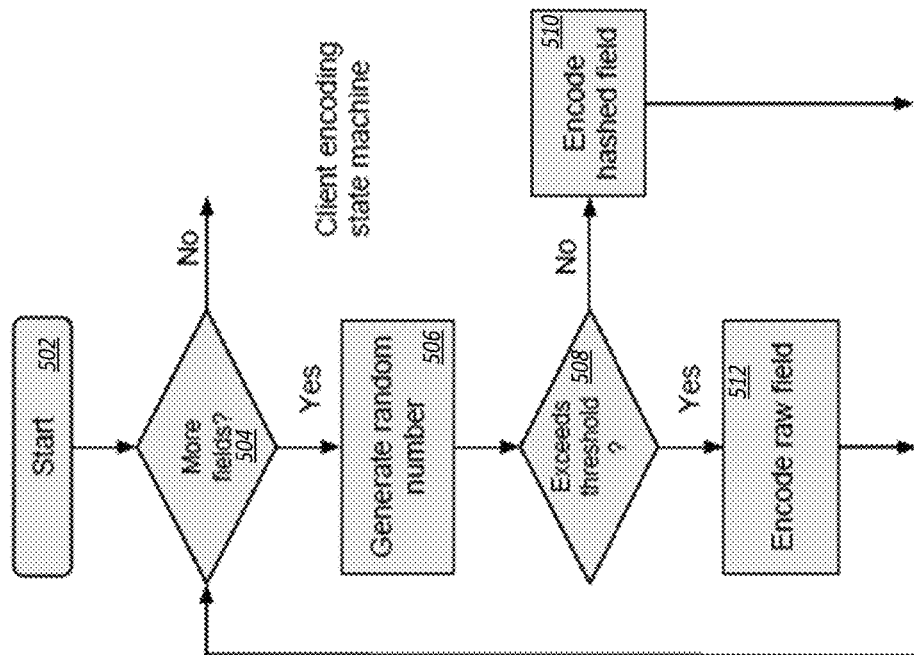
FIG. 5A is a representation of a state machine for client-side encoding.

FIGS. 5A and 5B show, respectively, state diagrams for a client and a server operating according to the mechanisms described above. Referring specifically to the client encoding state machine of FIG. 5A, at box 502, the client device begins its operations by which it prepares information for transmission to the server system and performs the transmission. At box 504, a determination is made whether more fields need to be encoded for transmission. If not, then the client waits until a next time that processing and transmission is needed.

At box 506, if more fields need to be transmitted to the server, a random number (which may be pseudorandom or otherwise less than exactly random) is generated at box 506. The number may be generated for each overall transmission or for each field within a transmission (so that some field values may be compressed and some not). At box 508, the client determines whether the generated number exceeds a threshold. That threshold may be a predetermined value that is relatively permanent and stored by the client for a long time, or may be highly variable, where the threshold is transmitted with code recently received by the client, or is accessed at run time by the client (e.g., by submitting a GET function to a remote server system). If the generated number exceeds the threshold, then the client sends a raw version of the relevant field, such as in plaintext or losslessly compressed form of the content for the field (box 512). If the threshold is not exceeded, then a hashed version of the content is sent (box 510). Of course, the determination may be made inversely, so that the hashed form is sent if the threshold is exceeded (and/or matched), and the raw data is sent if it is not (and/or is matched).

Referring now to FIG. 5B, there is shown a state diagram for a server that interacts with the operations of the client just described. At box 520, the process begins, such as by the server determining that it has received data for a plurality of fields, where the data needs to be interpreted by the server system. If there are no more fields to process, the system returns to a rest state, but if there are, then the server analyzes the next field in line and determines whether it is in raw form or hash form (box 524). If it is in raw form, then the server hashes the field using a hashing technique that matches a technique that the server knows to be performed by various clients that are reporting data to it (box 532). The server then associates the hash result with the raw content (box 534). The system can then use such a correlation between the hash result and the raw data to interpret other communications form other clients that contain only the hash result. In particular, the system can use the correlation to infer what the raw form at the client was when only the hash form is received.

If the field is not in raw form (is in hash form), the system performs a lookup on the hash form (box 526). The system determines whether the hash form of the field is found in the system (box 528), so as to indicate that a correlation has already been stored between the hash form and the raw form. If the hash form is found, then the system can get the raw value a (box 530) and act accordingly. If the field is not found (e.g., because the value for the field has not previously been received in raw form), then the occurrence of the receipt of the hash form from the client may be saved and noted, and the system may return to check if additional fields need processing.

Figure 6:
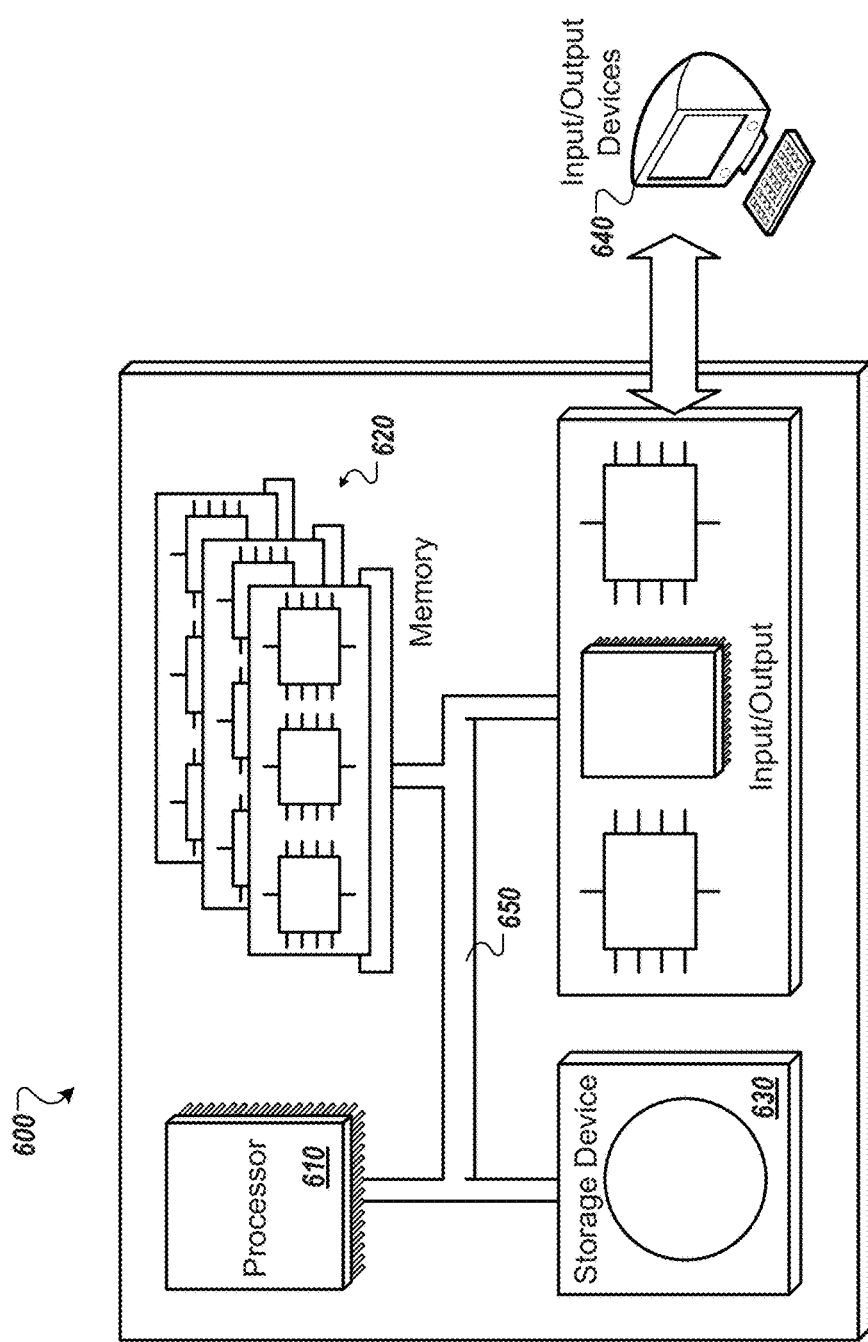
FIG. 6 is a block diagram of a generic computer system for implementing the processes and systems described herein.

FIG. 6 is a schematic diagram of a computer system 600. The system 600 can be used for the operations described in association with any of the computer-implement methods described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
serving, from a computer server system and to a plurality of computing devices remote from the computer server system, web code and code for reporting status of the plurality of computing devices;
receiving, from one or more first computing devices of the plurality of computing devices, first data comprising a compressed value generated by applying a lossy compression format to a parameter of the one or more first computing devices;
receiving, from one or more second computing devices of the plurality of computing devices that are different from the one or more first computing devices, second data that indicates the parameter of the one or more second computing devices in a lossless format; and
generating compressed second data by applying the lossy compression format to the second data;

determining the parameter of the one or more first computing devices by comparing the compressed second data to the first data to correlate the first data to the second data;
wherein the code for reporting status of the plurality of computing devices includes code for allowing the plurality of computing devices to determine whether to send the first data or the second data.

2. The computer-implemented method of claim 1, wherein the code for allowing the plurality of computing devices to determine whether to send the first data or the second data comprises biasing data that affects a frequency with which the plurality of computing devices select to send the first data or the second data.

3. The computer-implemented method of claim 1, wherein the first data is compressed on the plurality of computing devices using hashing.

4. The computer-implemented method of claim 3, wherein the computer server system does not send hashing algorithm information to the plurality of computing devices.

5. The computer-implemented method of claim 1, further comprising using the lossy compression format to represent the parameter in identifying aggregate activity by multiple of the plurality of computing devices.

6. The computer-implemented method of claim 5, further comprising determining from the aggregate activity whether one or more of the plurality of computing devices is infected with malware.

7. The computer-implemented method of claim 1, wherein the computer server system comprises an intermediary security server system that is separate from a web server system that generates and serves the web code.

8. The computer-implemented method of claim 1, further comprising comparing information sent with the compressed second data to information derived from the received first data to determine whether the compressed second data was generated from data that matches the first data.

9. One or more non-transitory storage devices storing instructions that, when executed by one or more computer processors, perform operations comprising:
serving, from a computer server system and to a plurality of computing devices remote from the computer server system, web code and code for reporting status of the plurality of computing devices;
receiving, from one or more first computing devices of the plurality of computing devices, first data comprising a compressed value generated by applying a lossy compression format to a parameter of the one or more first computing devices;
receiving, from one or more second computing devices of the plurality of computing devices that are different from the one or more first computing devices, second data that indicates the parameter of the one or more second computing devices in a lossless format; and
generating compressed second data by applying the lossy compression format to the second data;
determining the parameter of the one or more first computing devices by comparing the compressed second data to the first data to correlate the first data to the second data;
wherein the code for reporting status of the plurality of computing devices includes code for allowing the plurality of computing devices to determine whether to send the first data or the second data.

10. The one or more non-transitory storage devices of claim 9, wherein the operations further comprise using the lossy compression format to represent the parameter in identifying aggregate activity by multiple of the plurality of computing devices.

11. The one or more non-transitory storage devices of claim 9, wherein the computer server system comprises an intermediary security server system that is separate from a web server system that generates and serves the web code.

12. The one or more non-transitory storage devices of claim 9, wherein the operations further comprise comparing information sent with the compressed second data to information derived from the received first data to determine whether the compressed second data was generated from data that matches the first data.

13. A computer system comprising:
one or more hardware processors;
memory coupled to the one or more hardware processors and storing one or more instructions which, when executed by the one or more hardware processors, cause the one or more hardware processors to:
serve, from a computer server system and to a plurality of computing devices remote from the computer server system, web code and code for reporting status of the plurality of computing devices;
receive, from one or more first computing devices of the plurality of computing devices, first data comprising a compressed value generated by applying a lossy compression format to a parameter of the one or more first computing devices;
receive, from one or more second computing devices of the plurality of computing devices that are different from the one or more first computing devices, second data that indicates the parameter of the one or more second computing devices in a lossless format; and
generate compressed second data by applying the lossy compression format to the second data;
determine the parameter of the one or more first computing devices by comparing the compressed second data to the first data to correlate the first data to the second data;
wherein the code for reporting status of the plurality of computing devices includes code for allowing the plurality of computing devices to determine whether to send the first data or the second data.

14. The computer system of claim 13, wherein the code for allowing the plurality of computing devices to determine whether to send the first data or the second data comprises biasing data that affects a frequency with which the plurality of computing devices select to send the first data or the second data.

15. The computer system of claim 13, wherein the first data is compressed on the plurality of computing devices using hashing.

16. The computer system of claim 15, wherein the computer server system does not send hashing algorithm information to the plurality of computing devices.

17. The computer system of claim 13, wherein the one or more instructions, when executed by the one or more hardware processors, cause the one or more processors to:
Use the lossy compression format to represent the parameter in identifying aggregate activity by multiple of the plurality of computing devices.

18. The computer system of claim 17, wherein the one or more instructions, when executed by the one or more hardware processors, cause the one or more processors to:
determine from the aggregate activity whether one or more of the plurality of computing devices is infected with malware.

19. The computer system of claim 13, wherein the computer server system comprises an intermediary security server system that is separate from a web server system that generates and serves the web code.

20. The computer system of claim 13, wherein the one or more instructions, when executed by the one or more hardware processors, cause the one or more processors to:
   compare information sent with the compressed second data to information derived from the received first data to determine whether the compressed second data was generated from data that matches the first data.

* * * * *